US012692014B2

(12) United States Patent
Mackin et al.

(10) Patent No.: US 12,692,014 B2
(45) Date of Patent: Jul. 28, 2026

(54) AIRCRAFT COMPARTMENT OVERHEAT INDICATOR, SYSTEM, AND METHOD

(71) Applicant: The Boeing Company, Arlington, VA (US)

(72) Inventors: Steve Mackin, Bellevue, WA (US); Joseph Thomas Auterman, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 69 days.

(21) Appl. No.: 18/928,454

(22) Filed: Oct. 28, 2024

(65) Prior Publication Data

US 2026/0116571 A1     Apr. 30, 2026

(51) Int. Cl.
| | |
|---|---|
| *B64D 45/00* | (2006.01) |
| *G08B 5/36* | (2006.01) |
| *G08B 17/02* | (2006.01) |

(52) U.S. Cl.
CPC .............. *B64D 45/00* (2013.01); *G08B 5/36* (2013.01); *G08B 17/02* (2013.01); *B64D 2045/009* (2013.01)

(58) Field of Classification Search
None
See application file for complete search history.

(56) References Cited

U.S. PATENT DOCUMENTS

| | | | | | |
|---|---|---|---|---|---|
| 5,046,447 | A * | 9/1991 | Steinke | .................. | G01K 11/06 374/E11.006 |
| 6,189,479 | B1 * | 2/2001 | Hudson | .................. | G01K 11/06 374/E11.006 |
| 9,472,079 | B2 * | 10/2016 | Meier | .................... | G08B 29/22 |
| 10,380,861 | B2 * | 8/2019 | Nichols | .................... | G01K 5/34 |
| 12,491,784 | B2 * | 12/2025 | Wiegman | ................ | B60L 53/60 |
| 2006/0040174 | A1 | 2/2006 | Peabody | | |
| 2015/0246734 | A1 * | 9/2015 | Tweet | .................... | B64D 45/00 244/129.2 |
| 2016/0096051 | A1 * | 4/2016 | Baker | .................... | A62C 37/36 169/46 |
| 2019/0339149 | A1 * | 11/2019 | Swanson | ................. | G01L 7/063 |
| 2021/0399203 | A1 * | 12/2021 | Farhangdoust | ....... | H02J 50/001 |
| 2023/0221187 | A1 * | 7/2023 | Ford | ......................... | B60B 3/16 374/10 |
| 2024/0109642 | A1 * | 4/2024 | Bonaccurso | .............. | B64C 1/40 |
| 2024/0125674 | A1 * | 4/2024 | Plamondon | ............. | F04B 49/20 |

FOREIGN PATENT DOCUMENTS

| | | |
|---|---|---|
| EP | 4219311 A1 | 8/2023 |

OTHER PUBLICATIONS

EP Search Report mailed Jan. 12, 2026 in re EP Application No. 25193206.7.

* cited by examiner

*Primary Examiner* — Muhammad Adnan
(74) *Attorney, Agent, or Firm* — COATS & BENNETT, PLLC

(57) ABSTRACT

Single use and replaceable self-powered aircraft compartment thermal indicators that deliver a localized visually detectable signal that can be perceived by personnel at the exterior of an aircraft component and that can be activated on demand to signal the presence of a temperature within an aircraft compartment that exceeds a threshold temperature and that can be tested in situ, and methods of use are disclosed.

20 Claims, 10 Drawing Sheets

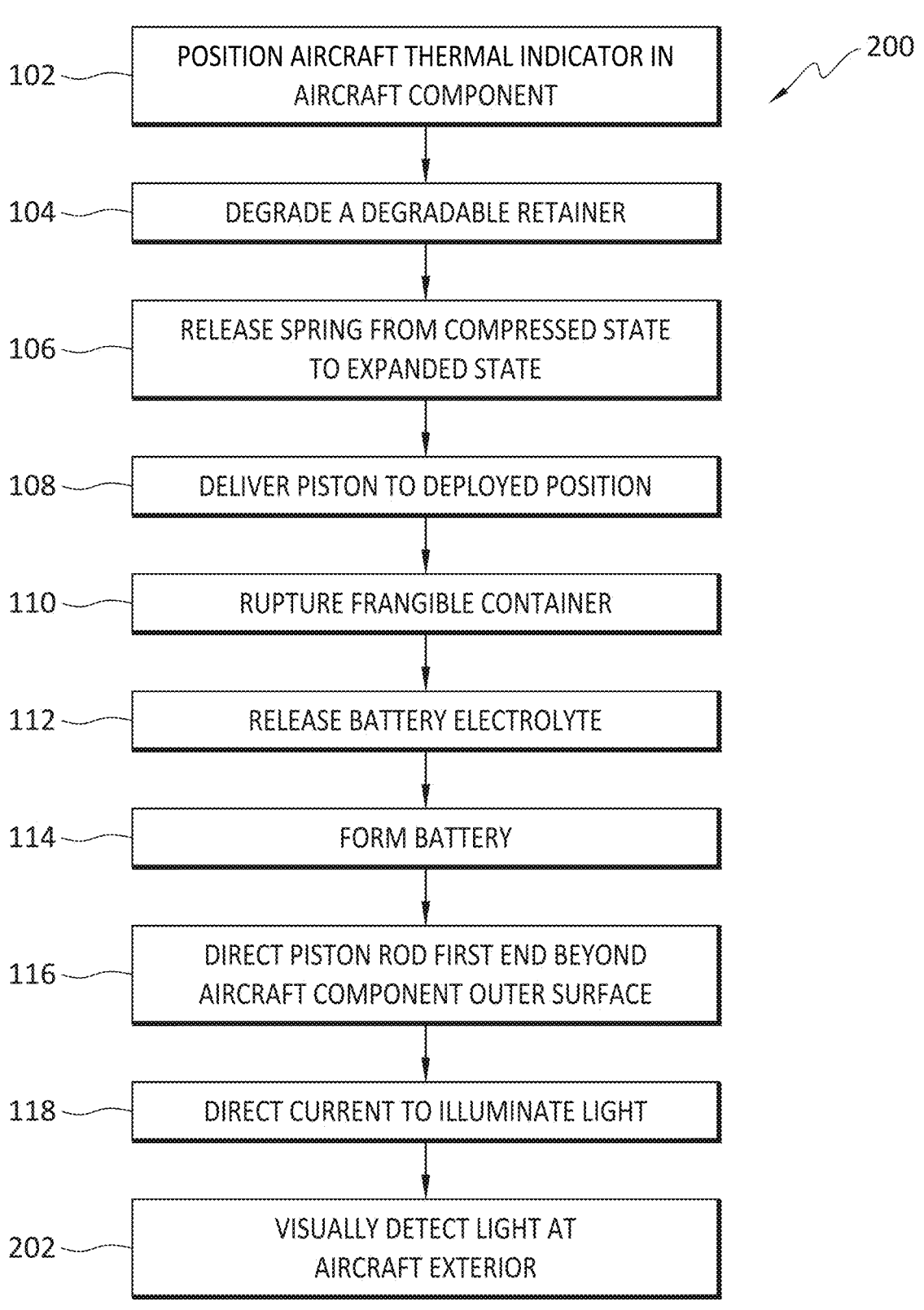

102 — POSITION AIRCRAFT THERMAL INDICATOR IN AIRCRAFT COMPONENT

104 — DEGRADE A DEGRADABLE RETAINER

106 — RELEASE SPRING FROM COMPRESSED STATE TO EXPANDED STATE

108 — DELIVER PISTON TO DEPLOYED POSITION

110 — RUPTURE FRANGIBLE CONTAINER

112 — RELEASE BATTERY ELECTROLYTE

114 — FORM BATTERY

116 — DIRECT PISTON ROD FIRST END BEYOND AIRCRAFT COMPONENT OUTER SURFACE

118 — DIRECT CURRENT TO ILLUMINATE LIGHT

202 — VISUALLY DETECT LIGHT AT AIRCRAFT EXTERIOR

AIRCRAFT COMPARTMENT OVERHEAT INDICATOR, SYSTEM, AND METHOD

GOVERNMENT RIGHTS

The invention was made with Government support under (FA8628-19-D-1000-FA810722F0001) awarded by the Department of Defense. The government has certain rights in this invention.

TECHNOLOGICAL FIELD

The present disclosure relates generally to the field of aircraft compartment temperature indication. More specifically, the present disclosure relates to the field of specific aircraft compartment temperature indication for indicating aircraft compartment excessive temperature.

BACKGROUND

Ambient and operating temperatures existing within an aircraft can be monitored within cabin compartments, storage compartments, cargo compartments, and mechanical compartments to promote safety and otherwise ensure that temperatures within monitored compartments are maintained within an accepted temperature range.

System feedback from temperature monitoring systems can be relayed to personnel within an aircraft located within a cockpit. In an aircraft or other vehicle type, overall weight is a factor, and onboard power usage and power drain for operating electrical thermal monitoring systems, as well as the weight of electrical monitoring systems themselves (including monitoring system hardware, linkages, connections, wiring, etc.) can create an undesirable additional weight to an aircraft that can significantly increase operational costs. Unless explicitly identified as such, no statement herein is admitted as prior art merely by of such statement's inclusion in the Technological Field and/or Background section.

SUMMARY

Present aspects are directed to a self-powered thermal indicator for an aircraft compartment that can be activated when a region of the thermal indicator is exposed to or otherwise encounters an ambient temperature that exceeds a selected threshold temperature that can include a threshold temperature range, with at least a region of the thermal indicator visible from and at the exterior of the aircraft.

A present aspect is directed to a self-powered aircraft compartment thermal indicator (20) for determining an above-threshold temperature in an aircraft internal region, with the aircraft compartment thermal indicator comprising an indicator body comprising an indicator body length ("l"). The indicator body further comprises an indicator body interior, an indicator body exterior, an indicator body first end (e.g., the indicating side), an indicator body second end; an indicator body second end base, and an internal piston. The internal piston further comprises, a piston base, with the piston base comprising a piston base first side and a piston base second side, with the internal piston further comprising a piston rod, and with the piston rod comprising a piston rod first end and a piston rod second end, and with the piston rod second end at least in communication with the piston base first side. The indicator body further comprises an indicator body wall, with the indicator body wall extending along the indicator body length from the indicator body first end to the indicator body second end, and with the indicator body wall comprising an indicator body wall outer surface at the indicator body exterior and an indicator body wall inner surface at the indicator body interior. The indicator body further comprises a battery compartment, with the battery compartment comprising a battery compartment base, and with the battery compartment defined by the battery compartment base and the indicator body wall inner surface. The indicator body further comprises an indicator body first chamber defined by the indicator body wall inner surface, the piston base first side, and the battery compartment base, with the indicator body first chamber comprising a frangible container, and with the frangible container housing a volume of battery electrolyte. The indicator body further comprises an indicator body second chamber defined by the indicator body wall inner surface and the piston base second side, with the indicator body second chamber comprising a spring, with the spring comprising a spring first end fixedly attached to the piston base, and with the spring further comprising a spring second end located immediately adjacent the indicator body second end base. The indicator body second chamber further comprises a degradable retainer, with the degradable retainer in communication with the spring, with the degradable retainer configured to retain the spring in a compressed spring state within a first temperature range, with the degradable retainer configured to degrade at a threshold temperature, with the threshold temperature within a second temperature range, with the degradable retainer further configured to retain the spring in a compressed spring state while at the first temperature range, and with the degradable retainer further configured to release the spring from the compressed spring state toward an expanded spring state at the threshold temperature in the second temperature range, and wherein the threshold temperature is higher than the first temperature range.

In another present aspect, the aircraft compartment comprises an aircraft internal region comprising a localized region within an aircraft compartment.

In another present aspect, the aircraft compartment thermal indicator is self-powered.

In another present aspect, the aircraft compartment thermal indicator further comprises a light fixture in communication with the piston rod first end.

In another present aspect, the light fixture is a light-emitting diode (LED).

In another present aspect, the battery compartment further comprises a plurality of battery plates.

In another present aspect, the degradable retainer comprises at least one of a low temperature alloy, and a wax, with the at least one of the low temperature alloy, and the wax degradable retainer comprising a melting point ranging from about 140° F. to about 165° F.

In another present aspect the low temperature alloy comprises a low temperature metal alloy comprising at least one of bismuth, lead, tin, indium, cadmium, thallium, gallium, and combinations thereof, with the low temperature alloy comprising a melting point ranging from about 140° F. to about 165° F.

In another present aspect, the low temperature alloy comprises at least one of rose's metal, cerrosafe, wood's metal, field's metal, cerrolow 136, cerrolow 117, gallium, and combinations thereof.

In a further present aspect, the battery plates in the presence of the electrolyte (34a) are configured to form a battery configured to deliver an electrical current.

In another present aspect, the battery is a fuze battery.

In another present aspect, the aircraft compartment thermal indicator further comprises an integrated heat-directing tube in immediate contact with the degradable retainer.

In another present aspect, the aircraft compartment thermal indicator is removably attached to an aircraft substrate.

In a further present aspect, the aircraft compartment thermal indicator can be tested and inspected in situ.

In another present aspect, the aircraft compartment thermal indicator further comprises an integrated heat-directing tube comprising a heat-directing tube first end fixedly extending into the indicator body second chamber, and a heat-directing tube second end extending a selected distance from and out of the indicator body second end base.

In another present aspect, the heat-directing tube further comprises a heat-directing tube wall, with the heat-directing tube wall comprising a heat-directing tube wall outer perimeter that is positioned substantially adjacent to the degradable retainer in the indicator body second chamber.

A further present aspect is directed to an aircraft component comprising a self-powered aircraft compartment thermal indicator for determining an above-threshold temperature in an aircraft internal region, with the aircraft compartment thermal indicator comprising an indicator body comprising an indicator body length ("l"). The indicator body further comprises an indicator body interior, an indicator body exterior, an indicator body first end (e.g. an indicating side), an indicator body second end, an indicator body second end base, and an internal piston. The internal piston further comprises, a piston base, with the piston base comprising a piston base first side and a piston base second side, with the internal piston further comprising a piston rod, and with the piston rod comprising a piston rod first end and a piston rod second end, and with the piston rod second end at least in communication with the piston base first side. The indicator body further comprises an indicator body wall, with the indicator body wall extending along the indicator body length from the indicator body first end to the indicator body second end, and with the indicator body wall comprising an indicator body wall outer surface at the indicator body exterior and an indicator body wall inner surface at the indicator body interior. The indicator body further comprises a battery compartment, with the battery compartment comprising a battery compartment base, and with the battery compartment defined by the battery compartment base and the indicator body wall inner surface. The indicator body further comprises an indicator body first chamber defined by the indicator body wall inner surface, the piston base first side, and the battery compartment base, with the indicator body first chamber comprising a frangible container, and with the frangible container housing a volume of battery electrolyte. The indicator body further comprises an indicator body second chamber defined by the indicator body wall inner surface and the piston base second side, with the indicator body second chamber comprising a spring, with the spring comprising a spring first end fixedly attached to the piston base, and with the spring further comprising a spring second end located immediately adjacent the indicator body second end base. The indicator body second chamber further comprises a degradable retainer, with the degradable retainer in communication with the spring, with the degradable retainer configured to retain the spring in a compressed spring state within a first temperature range, with the degradable retainer configured to degrade at a threshold temperature, with the threshold temperature within a second temperature range, with the degradable retainer further configured to retain the spring in a compressed spring state while at the first temperature range, and with the degradable retainer further configured to release the spring from the compressed spring state toward an expanded spring state at the threshold temperature in the second temperature range, and wherein the threshold temperature is higher than the first temperature range.

In another present aspect, the aircraft component is an aircraft wing component.

Another present aspect is directed to an aircraft comprising a self-powered aircraft compartment thermal indicator for determining an above-threshold temperature in an aircraft internal region, with the aircraft compartment thermal indicator comprising an indicator body comprising an indicator body length ("l"). The indicator body further comprises an indicator body interior, an indicator body exterior, an indicator body first end (e.g., indicating side), an indicator body second end, an indicator body second end base, and an internal piston. The internal piston further comprises, a piston base, with the piston base comprising a piston base first side and a piston base second side, with the internal piston further comprising a piston rod, and with the piston rod comprising a piston rod first end and a piston rod second end, and with the piston rod second end at least in communication with the piston base first side. The indicator body further comprises an indicator body wall, with the indicator body wall extending along the indicator body length from the indicator body first end to the indicator body second end, and with the indicator body wall comprising an indicator body wall outer surface at the indicator body exterior and an indicator body wall inner surface at the indicator body interior. The indicator body further comprises a battery compartment, with the battery compartment comprising a battery compartment base, and with the battery compartment defined by the battery compartment base and the indicator body wall inner surface. The indicator body further comprises an indicator body first chamber defined by the indicator body wall inner surface, the piston base first side, and the battery compartment base, with the indicator body first chamber comprising a frangible container, and with the frangible container housing a volume of battery electrolyte. The indicator body further comprises an indicator body second chamber defined by the indicator body wall inner surface and the piston base second side, with the indicator body second chamber comprising a spring, with the spring comprising a spring first end fixedly attached to the piston base, and with the spring further comprising a spring second end located immediately adjacent the indicator body second end base. The indicator body second chamber further comprises a degradable retainer, with the degradable retainer in communication with the spring, with the degradable retainer configured to retain the spring in a compressed spring state within a first temperature range, with the degradable retainer configured to degrade at a threshold temperature, with the threshold temperature within a second temperature range, with the degradable retainer further configured to retain the spring in a compressed spring state while at the first temperature range, and with the degradable retainer further configured to release the spring from the compressed spring state toward an expanded spring state at the threshold temperature in the second temperature range, and wherein the threshold temperature is higher than the first temperature range.

Another present aspect is directed to an aircraft compartment thermal indication system (referred to equivalently herein as an "aircraft compartment temperature indication system") for visually detecting at an aircraft exterior an above-threshold temperature within an aircraft compartment proximate to the aircraft exterior, the aircraft compartment thermal indication system comprising a self-powered aircraft compartment thermal indicator attached to an aircraft component, with the self-powered aircraft compartment thermal indicator comprising a configured to determine an above-threshold temperature in an aircraft internal compartment region, with the self-powered aircraft compartment thermal indicator comprising an indicator body comprising an indicator body length ("l"). The indicator body further comprises an indicator body interior, an indicator body exterior, an indicator body first end, an indicator body second end, an indicator body second end base, and an internal piston. The internal piston further comprises, a piston base, with the piston base comprising a piston base first side and a piston base second side, with the internal piston further comprising a piston rod, and with the piston rod comprising a piston rod first end and a piston rod second end, and with the piston rod second end at least in communication with the piston base first side. The indicator body further comprises an indicator body wall, with the indicator body wall extending along the indicator body length from the indicator body first end to the indicator body second end, and with the indicator body wall comprising an indicator body wall outer surface at the indicator body exterior and an indicator body wall inner surface at the indicator body interior. The indicator body further comprises a battery compartment with the battery compartment comprising a battery compartment base, and with the battery compartment defined by the battery compartment base and the indicator body wall inner surface. The indicator body further comprises an indicator body first chamber defined by the indicator body wall inner surface, the piston base first side, and the battery compartment base, with the indicator body first chamber comprising a frangible container, and with the frangible container housing a volume of battery electrolyte. The indicator body further comprises an indicator body second chamber defined by the indicator body wall inner surface and the piston base second side, with the indicator body second chamber comprising a spring, with the spring comprising a spring first end fixedly attached to the piston base, and with the spring further comprising a spring second end located immediately adjacent the indicator body second end base. The indicator body second chamber further comprises a degradable retainer, with the degradable retainer in communication with the spring, with the degradable retainer configured to retain the spring in a compressed spring state within a first temperature range, with the degradable retainer configured to degrade at a threshold temperature, with the threshold temperature within a second temperature range, with the degradable retainer further configured to retain the spring in a compressed spring state while at the first temperature range, and with the degradable retainer further configured to release the spring from the compressed spring state toward an expanded spring state at the threshold temperature in the second temperature range. The system further comprises a visually detectable signaling device located at and integrated within the indicator body first end, with the visually detectable signaling device in communication with the electrical circuit, and with the visually detectable signaling device further located at the aircraft exterior, and wherein the signaling device is configured to activate at and above a threshold temperature, and wherein the threshold temperature is higher than a first temperature range.

In another present aspect, the battery compartment comprises a plurality of battery plates.

In another present aspect, the visually detectable signaling device comprises a light fixture.

In another present aspect, the visually detectable signaling device comprises a light-emitting diode (LED).

In a further present aspect, the signaling device is configured to emit a beam of light in response to the indicator second end exposed to a threshold temperature ranging from about 140° F. to about 165° F.

In another present aspect, the self-powered aircraft compartment thermal indicator is removably attached to the aircraft component.

In another present aspect, the self-powered aircraft compartment thermal indicator is configured to be removed from an aircraft component from a location at the aircraft exterior.

In another present aspect, the self-powered aircraft compartment thermal indicator is accessible for inspection at the exterior of an aircraft.

In another present aspect, the battery is a fuze battery, with the fuze battery configured to be activated at the threshold temperature.

Another present aspect is directed to a method for detecting at an aircraft exterior a threshold temperature within an aircraft component internal region that can include an aircraft compartment located proximate to the aircraft exterior, with the method comprising positioning a self-powered aircraft compartment thermal indicator in an aircraft component, with the aircraft component comprising an aircraft component outer surface (e.g., aircraft exterior surface), with the aircraft component outer surface positioned adjacent to the aircraft component internal region that can include an aircraft compartment, with the aircraft compartment thermal indicator comprising an indicator body comprising an indicator body length ("l"). The indicator body further comprises an indicator body interior, an indicator body exterior, an indicator body first end (e.g., indicating side), an indicator body second end, an indicator body second end base, and an internal piston. The internal piston further comprises, a piston base, with the piston base comprising a piston base first side and a piston base second side, with the internal piston further comprising a piston rod, and with the piston rod comprising a piston rod first end and a piston rod second end, and with the piston rod second end at least in communication with the piston base first side. The indicator body further comprises an indicator body wall, with the indicator body wall extending along the indicator body length from the indicator body first end to the indicator body second end, and with the indicator body wall comprising an indicator body wall outer surface at the indicator body exterior and an indicator body wall inner surface at the indicator body interior. The indicator body further comprises a battery compartment, with the battery compartment comprising a battery compartment base, and with the battery compartment defined by the battery compartment base and the indicator body wall inner surface. The indicator body further comprises an indicator body first chamber defined by the indicator body wall inner surface, the piston base first side, and the battery compartment base, with the indicator body first chamber comprising a frangible container, and with the frangible container housing a volume of battery electrolyte. The indicator body further comprises an indicator body second chamber defined by the indicator body wall inner surface and the piston base second side, with the indicator body second chamber comprising a spring, with the spring comprising a spring first end fixedly attached to the piston base, and with the spring further comprising a spring second end located immediately adjacent the indicator body second end base. The indicator body second chamber further comprises a degradable retainer, with the degradable retainer in communication with the spring, with the degradable retainer configured to retain the spring in a compressed spring state within a first temperature range, with the degradable retainer configured to degrade at a threshold temperature, with the threshold temperature within a second temperature range, with the degradable retainer further configured to retain the spring in a compressed spring state while at the first temperature range, and with the degradable retainer further configured to release the spring from the compressed spring state toward an expanded spring state at the threshold temperature in the second temperature range, and wherein the threshold temperature is higher than the first temperature range. The method further comprises degrading the degradable retainer in the presence of a compartment temperature exceeding a threshold temperature, releasing the spring from the compressed spring state to the expanded spring state, delivering the piston from a piston initial position to a piston deployed position, rupturing the frangible container to form a ruptured frangible container, releasing from the ruptured frangible container at least a portion of the volume of battery electrolyte, directing at least a portion of the volume of battery electrolyte into the battery compartment to form a battery, with the battery configured to deliver produce electrical current, directing the piston rod first end through the indicator body first end through-opening to a selected distance beyond the aircraft component outer surface, and directing an electrical current from the battery to the light-emitting fixture to emit light from the light-emitting fixture.

In another present aspect, a method further comprises visually detecting at the aircraft exterior light emitted from the light-emitting fixture.

In another present aspect, a method further comprises removably positioning the self-powered aircraft compartment thermal indicator in the aircraft component.

In another present aspect, in a method visually detecting at the aircraft exterior the illuminated light from the aircraft compartment thermal indicator evidences at least a temperature exceeding a threshold temperature within the aircraft component.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
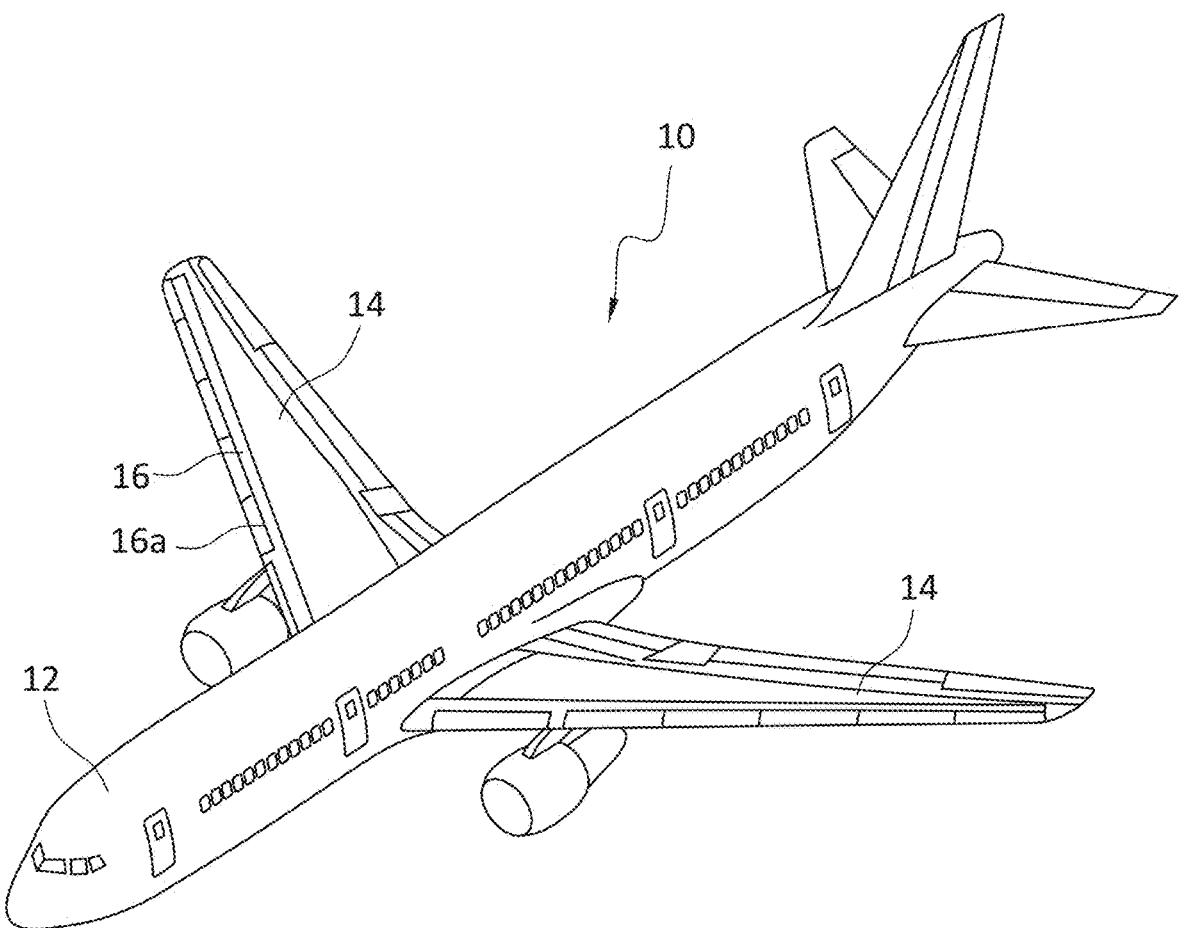
Figures 2, 3:
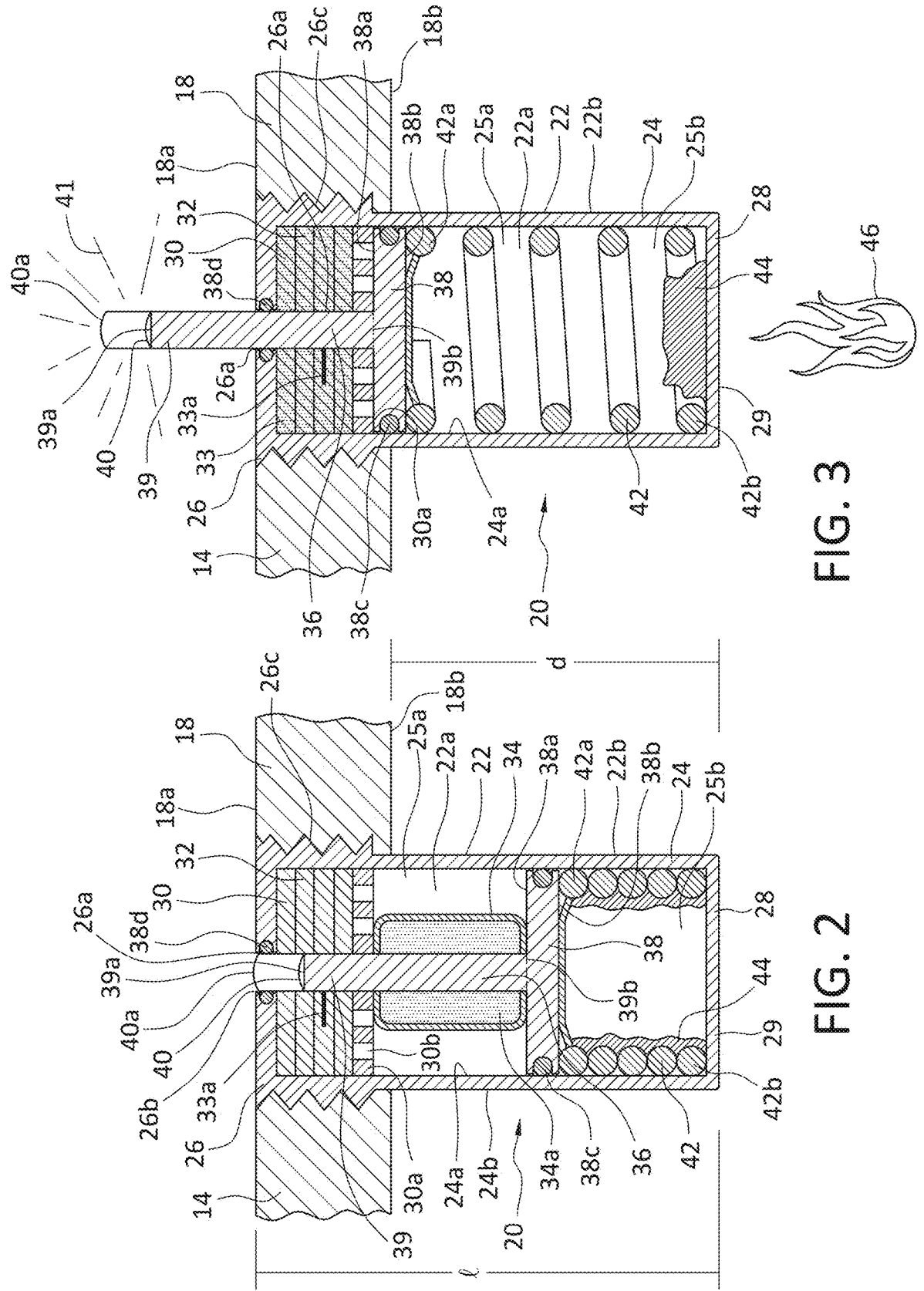
Figures 4A, 4B:
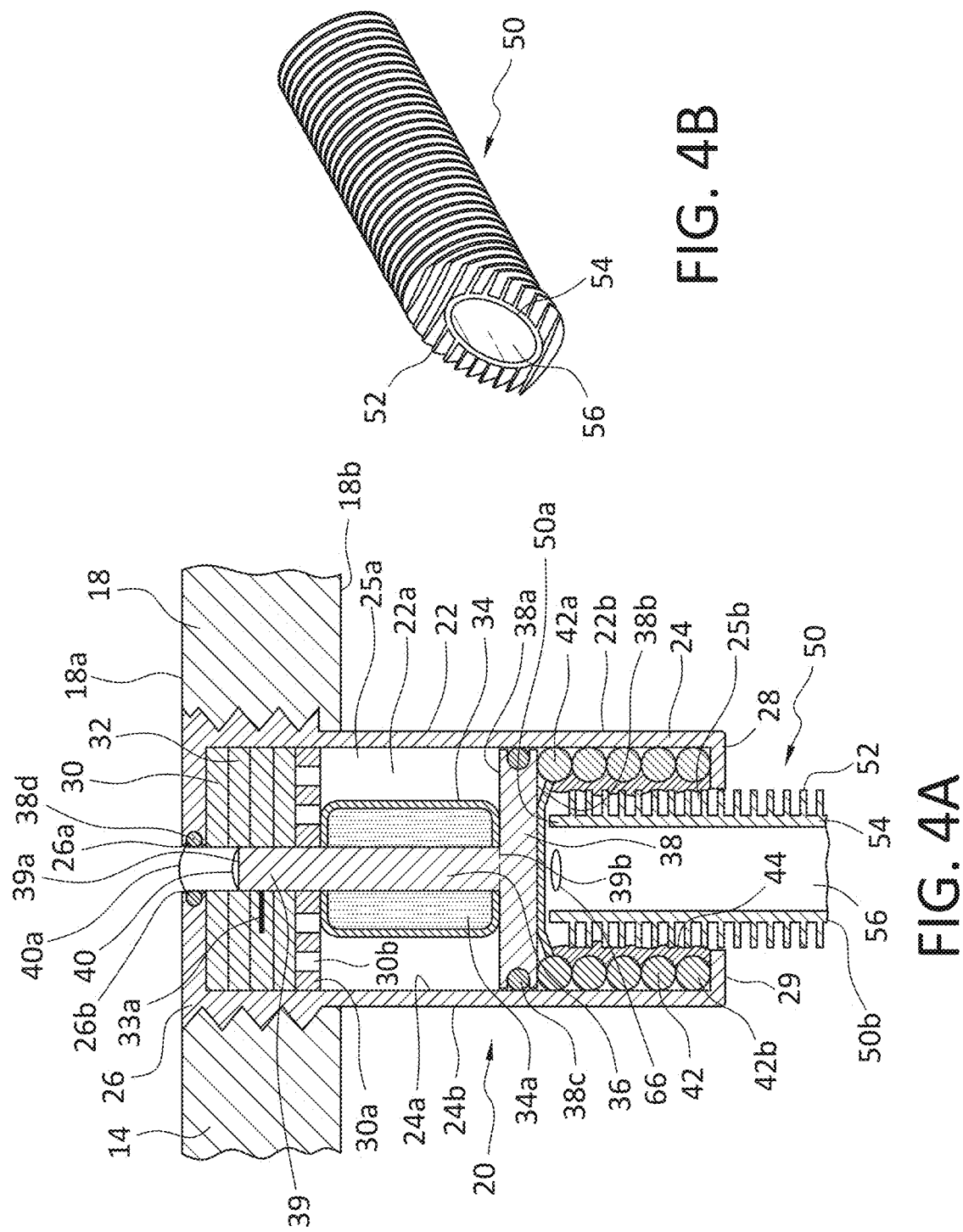
Figure 4C:
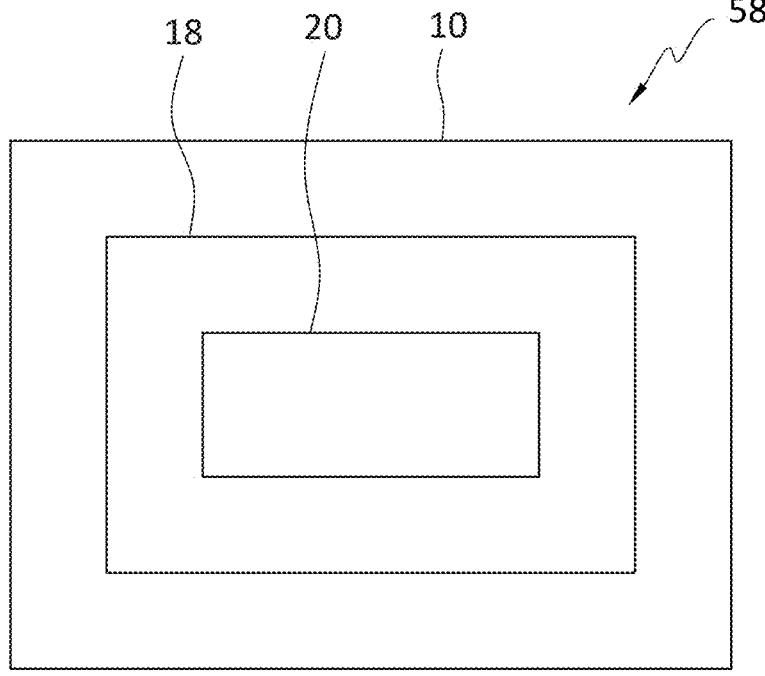
Figure 5A:
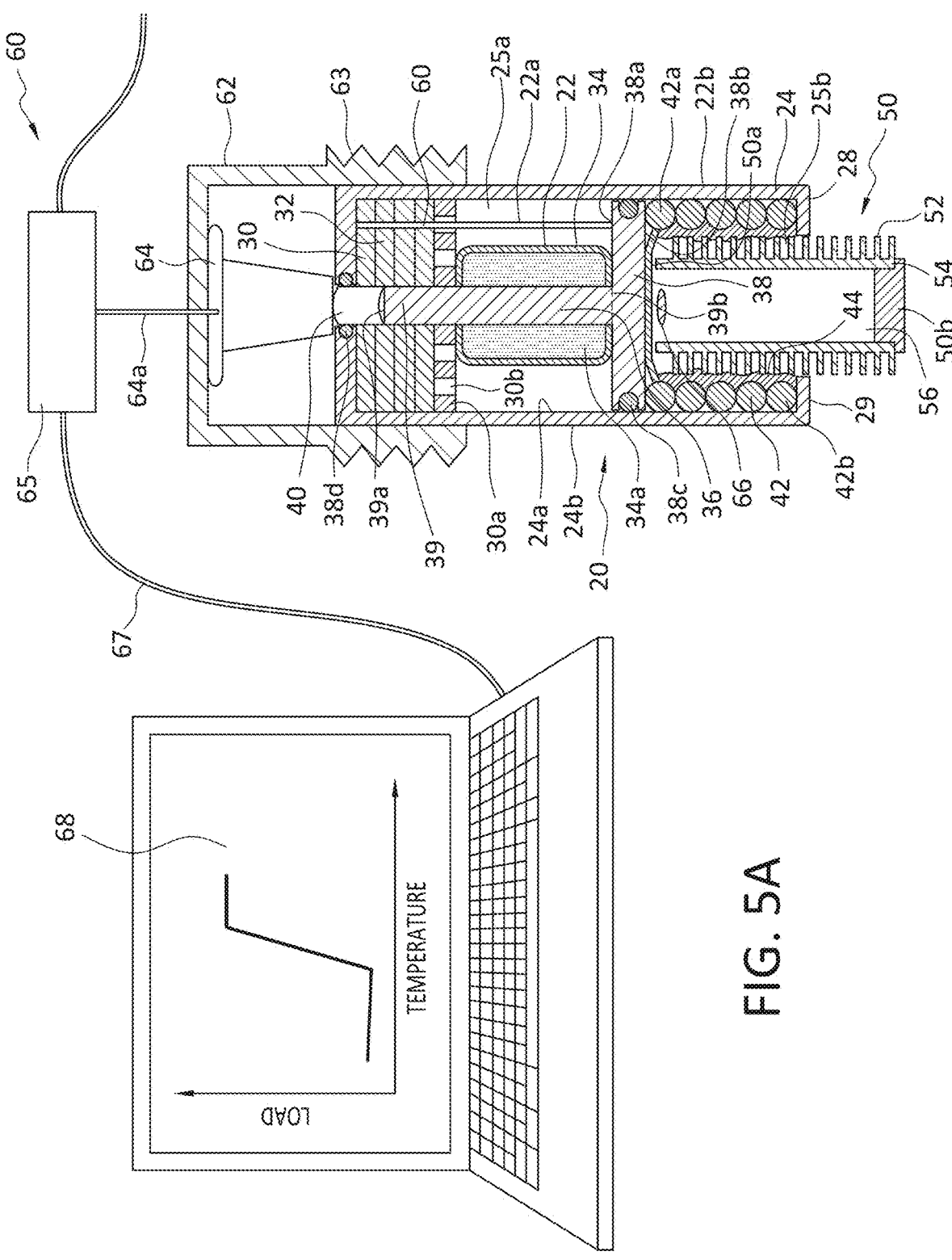
Figure 5B:
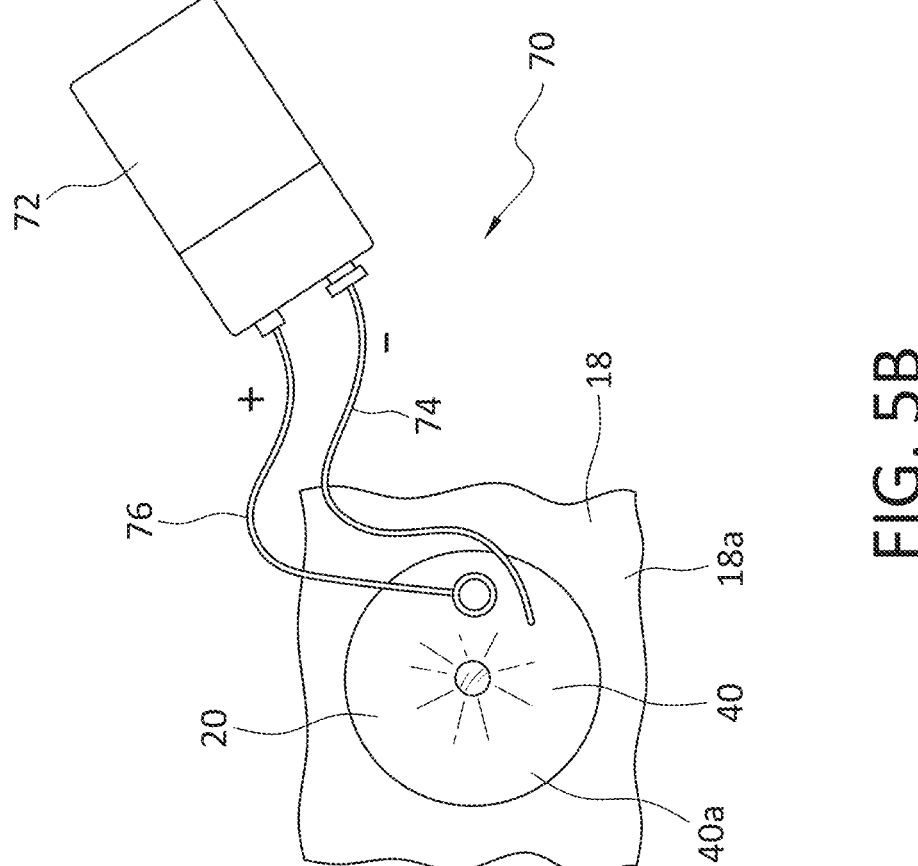
Figures 6, 7:
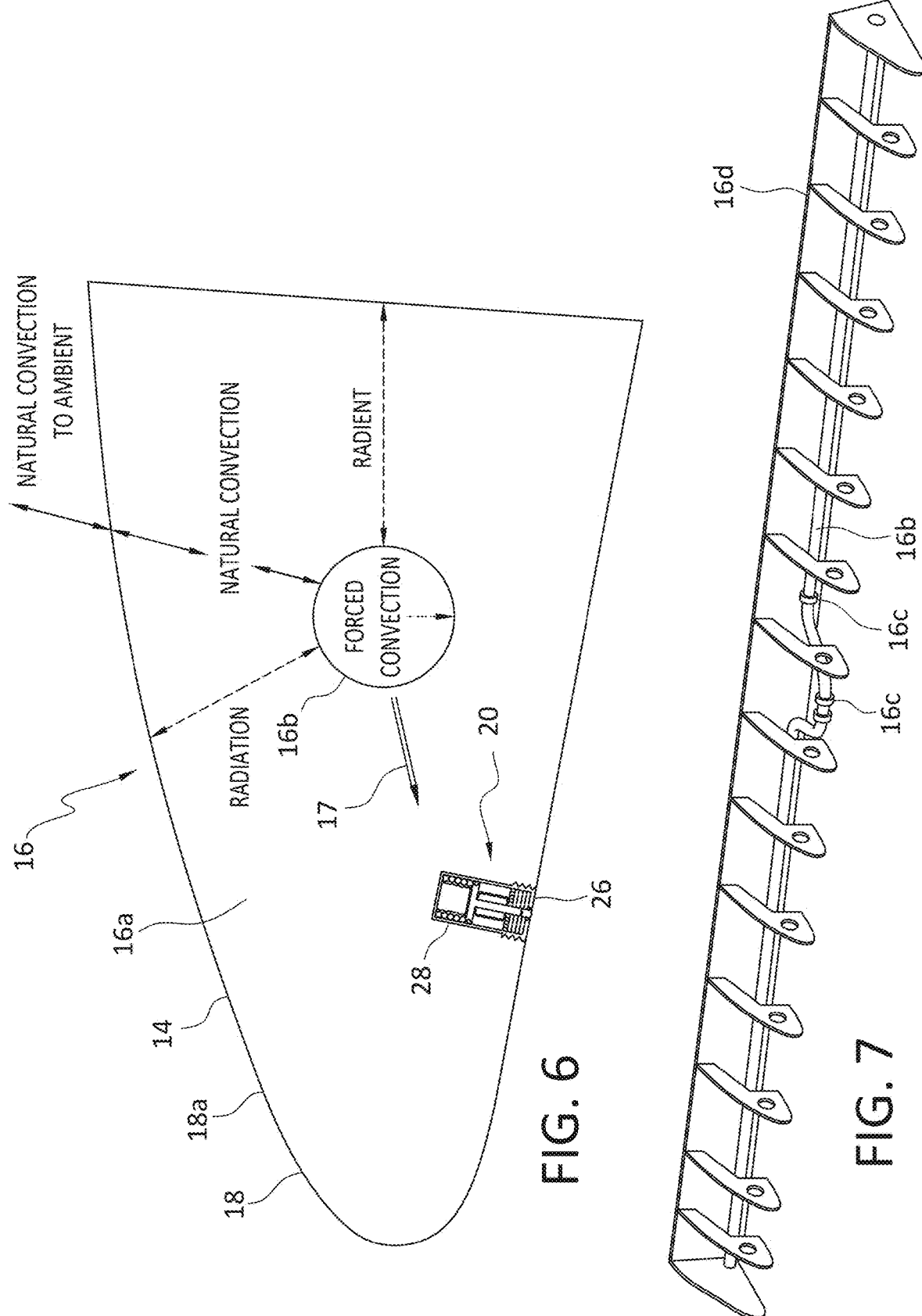
Figure 8:
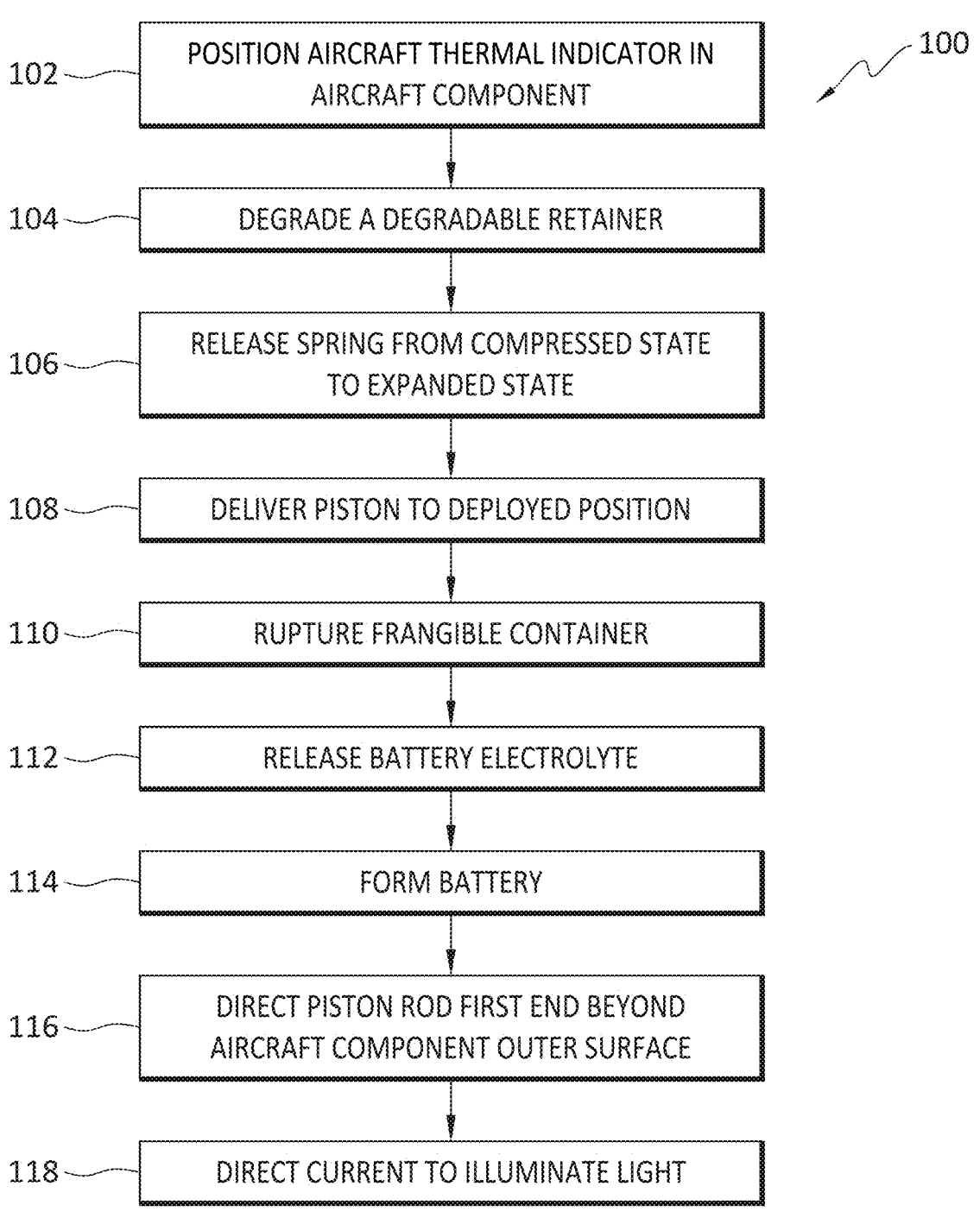

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is a cross-sectional side view of a self-powered aircraft compartment thermal indicator, according to present aspects FIG. 3 is a cross-sectional side view of a self-powered aircraft compartment thermal indicator of the type shown in FIG. 2, according to present aspects;

FIG. 4A is a cross-sectional side view of a self-powered aircraft compartment thermal indicator, according to present aspects;

FIG. 4B is a perspective partial view of a heat-directing tube of the type shown in FIG. 4A incorporated into the self-powered aircraft compartment thermal indicator, according to present aspects;

FIG. 4C is a box diagram illustrating an aircraft compartment temperature indication system for visually detecting at an aircraft exterior an above-threshold temperature within an aircraft compartment proximate to the aircraft exterior, according to present aspects;

FIG. 5A is an illustration of a testing system and method of the present self-powered aircraft compartment thermal indicator, according to present aspects;

FIG. 5B is an illustration of a testing system for the present self-powered aircraft compartment thermal indicator, according to present aspects;

FIG. 6 is a cross-sectional side view of an aircraft component in the form of an aircraft wing component comprising the present self-powered aircraft compartment thermal indicator, according to present aspects;

FIG. 7 is an illustration of a wing leading edge component, according to present aspects;

FIG. 8 is a flowchart outlining a method according to present aspects;

FIG. 9 is a flowchart outlining a method according to present aspects; and

Figure 10:
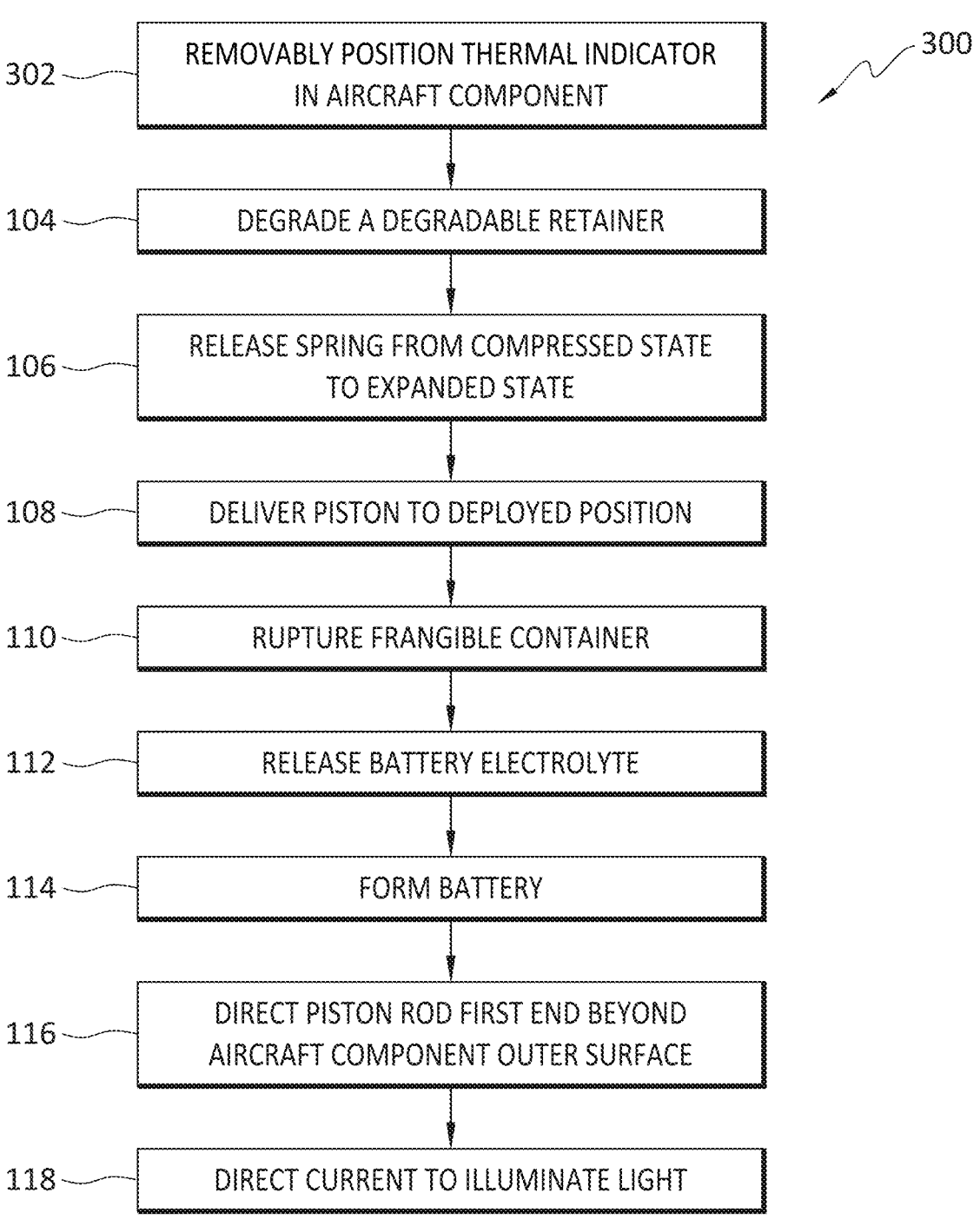

FIG. 10 is a flowchart outlining a method according to present aspects.

DETAILED DESCRIPTION

Detection of undesired levels of heat having elevated temperatures (e.g., that can be evidenced by quantitative and/or qualitative temperature measurement) that are elevated above and/or otherwise exceed an expected, and/or an acceptable temperature, referred to equivalently herein as a "threshold temperature", etc.) in various compartments and internal regions aboard an aircraft is desirable, including the detection of elevated temperatures caused by, for example, fire, and temperatures that can just precede flame ignition, etc. According to present aspects, a self-powered aircraft compartment thermal indicator (referred to equivalently herein as an "aircraft compartment thermal indicator", "aircraft thermal indicator", and "thermal indicator") is disclosed that can be removably installed into an aircraft substrate and/or aircraft component (e.g., an aircraft component part), including an aircraft compartment component. According to present aspects, the self-powered aircraft compartment thermal indicator comprises a portion of the thermal indicator that is exposed at, and is otherwise visible at, an exterior region of an aircraft, and visible from a viewing position that is outside of an aircraft, with the thermal indicator further positioned with a portion of the thermal indicator extending into an internal region of the aircraft that can be a localized internal region and that further can be an at least partially enclosed aircraft compartment.

According to present aspects, the term "aircraft compartment" includes fully enclosed internal regions within an aircraft, and further includes at least partially enclosed internal regions within an aircraft. That is, according to present aspects, an aircraft compartment may not be a fully and/or completely enclosed compartment. In another present aspect, an aircraft compartment can be a substantially completely enclosed internal aircraft compartment.

According to further present aspects, "self-powered" thermal indicators connote that the present thermal indicators comprise an internal and/or self-contained indicator power source and/or power supply that can be activated in the presence of temperatures at and above a selected threshold temperature. The present self-powered aircraft compartment thermal indicator does not, in operation, realize and/or otherwise cause an electrical power drain on an aircraft power supply and/or aircraft electrical power "grid". That is, the present self-powered thermal indicators, in operation, form a self-contained battery, on demand, and the thermal indicators operate discretely from, do not engage, and are not otherwise in communication with an aircraft power supply, an aircraft auxiliary power supply, etc.

FIG. 1 is a representative and non-limiting illustration of an aircraft of the type that can comprise the present self-powered aircraft compartment thermal indicator, with aircraft 10 comprising a fuselage 12, and a wing 14, with the wing further comprising a wing leading edge 16, and with the wing 14 housing an internal wing leading edge component 16a within a wing compartment housed within wing 14.

According to present aspects, the present self-powered aircraft compartment thermal indicator can be configured to be removably attached to an aircraft component for the purpose of indicating that a selected threshold temperature has been exceeded within at least one of an aircraft compartment located proximate to and/or adjacent to the thermal indicator, and a localized internal aircraft region located proximate to and/or immediately adjacent to and into which the thermal indicator temperature sensing side of the aircraft compartment thermal indicator (e.g., the indicator body second side) extends. According to present aspects, the aircraft compartment can be, but need not be, a completely enclosed compartment, into which the aircraft compartment thermal indicator extends. In a present example, the aircraft compartment can be an aircraft wing leading edge compartment that can house an aircraft bleed air duct comprising aircraft bleed air duct joints located along the bleed air duct.

According to present aspects, when an ambient temperature within an aircraft compartment and/or localized internal aircraft region exceeds a selected threshold temperature, the present self-powered aircraft compartment thermal indicator can be operably triggered to form an activated power supply (e.g., an activated power source), referred to equivalently herein as a battery, within the thermal indicator, with the activated power supply in communication with a visually detectable indicator (e.g., a light including a flashing light) that can be powered by the activated power supply, and with the visually detectable indicator configured to emit a visually detectable signal that can be detected at an external location of the aircraft at the aircraft exterior.

According to present aspects, the present self-powered aircraft compartment thermal indicator is configured to react to an environmental temperature changing from an ambient temperature that remains below a threshold temperature and/or below a threshold temperature range to an increased temperature that is above the threshold temperature and/or above a threshold temperature range. That is, the present self-powered aircraft compartment thermal indicator can be configured to activate at a selected temperature that is above a selected threshold temperature. The present self-powered aircraft compartment thermal indicator comprises a force-related component that can be, for example, a spring having a potential outward force when held in a compressed state by a retainer when the self-powered thermal indicator is maintained in an environment having ambient temperature that is below a threshold temperature. Below the threshold temperature, the retainer (referred to equivalently herein as a degradable retainer) possesses a sufficient retaining force on the compressed spring that exceeds the potential outward force of the compressed spring; resulting in the spring being held in the compressed or "retained" and/or restrained" state.

When the present self-powered aircraft compartment thermal indicator is subjected and/or exposed to a temperature exceeding the selected threshold temperature, the degradable retainer that can be made of a low-temperature alloy begins to change state and/or otherwise sustains a significant reduction in retaining force such that the retaining force is overcome and is otherwise exceeded by the potential outward force of the spring. When this occurs, the spring is released from a compressed or retained state and the spring expands outwardly along a lengthwise axis of the spring, with the spring now able to direct a force e.g., on an element positioned adjacent the spring in the compressed state) from an initial element position at rest to a "driven" or activated element position as driven by the spring.

In a present example, in operation, a pound-force ranging from about 10 lbf to about 30 lbf can be required to rupture the frangible battery electrolyte vessel contained within the thermal indicator. Accordingly, the present thermal indicator comprises a spring configured to deliver, in a spring releasing state, a similar force on the vessel rupturing element (e.g., the piston) ranging from about 10 lbf to about 30 lbf. As described herein, to retain the spring element in a compressed state when the present aircraft compartment thermal indicator is in the "inactive state", and where the degradable retainer is in the solid state and configured to retain the spring in the compressed or retained state, the degradable retainer is configured to apply a retaining force on the spring that exceeds the outward, spring releasing force of the spring.

In one present example, the degradable retainer is made from and/or otherwise comprises a "low-melting point" material (referred to equivalently herein as a "low-temperature material") that can be a low-melting point metal, a low-melting point alloy (referred to equivalently herein as a "low-temperature alloy"), a wax, and/or a material that will begin to sustain a phase change from a solid material to a liquid or semi-solid phase at a selected threshold temperature and/or selected threshold temperature range. That is, according to present aspects, when the present thermal indicator is exposed to an environment having a temperature that is at least at a selected threshold temperature, the low-melting point material will sustain a physical property change at least in terms of retaining force ability in the solid state, and the low-temperature material will "melt" into a liquid or semi-solid state (e.g., "semi-solid" being a state in which a material begins to "flow", etc.), with liquid and semi-solid states being referred to herein collectively as a "liquid state".

That is, according to present aspects, when the low-melting point material used to form the degradable retainer of the present aircraft compartment thermal indicator is in solid form and an environmental temperature in an aircraft compartment to which the thermal indicator is exposed is below a threshold temperature that can be, for example, below about 140° F., the degradable retainer maintains a retaining force in the solid state that exceeds the outward potential force of the spring that, for example, can be impregnated with the degradable retainer low-melting point material, and the degradable retainer maintains the spring in a compressed and/or "retained" state. As an environmental temperature to which the thermal indicator is exposed elevates to and/or exceeds a threshold temperature ranging, in one example, from about 140° F. to about 200° F., the low-melting point material used to form the degradable retainer changes state from the solid phase to a liquid phase, (e.g., liquid "state") such that the low-melting point material in the liquid (e.g., in the "non-solid" state) possesses a retaining force that is then lower than the outward potential force of the spring (and that is lower than when the low-melting point material in the solid state), resulting in a release of the spring from an initial compressed state to an expanded and released spring state.

As stated herein, and according to present aspects, the degradable retainer comprises a "low-melting point" material (referred to equivalently herein as a "low temperature material" and/or "low temperature alloy") that is in a solid phase below a selected threshold temperature that, in one present example, is about 200° F. In another present example, the selected threshold temperature is a threshold temperature ranging from about 160° F. to about 240° F. In another present example, the selected threshold is a temperature at which an electronics-generated fire can occur, and ranging from about 160° F. to about 180° F. In another present example, the selected threshold temperature is an elevated temperature in an aircraft hydraulic compartment ranging from about 160° F. to about 280° F. In another present example, the selected threshold temperature is a threshold temperature ranging from about 140° F. to about 165° F. In another present example, the selected threshold for a cargo storage compartment and/or an aircraft passenger cabin storage bin can be a temperature ranging from about 160° F. to about 170° F.

That is, according to present aspects, the present aircraft compartment thermal indicator can be selectively tuned and otherwise constructed to provide a thermal indication at a selected temperature and/or selected temperature range that can vary depending on the installed location of the thermal indication and further depending on the aircraft region and/or aircraft compartment that is selected to be monitored for a change in, or for the presence of, an elevated temperature that is undesired. According to present aspects, the thermal indication properties of the present thermal indicators can be selected to substantially match a threshold temperature to be monitored onboard an aircraft that can include the monitoring of aircraft compartments that can require overheat protection; where early elevated temperature detection can be significantly beneficial. Aircraft compartments that can benefit from overheat protection can include, for example, fuel tanks, regions adjacent fuel tanks, compartments housing hot air and/or bleed air ducts, cargo compartments, passenger storage compartments, compartments housing electrical components and/or hydraulic components, battery compartments, engine fan cases, wheel wells, etc.

Further present aspects contemplate the detection of a threshold temperature achieved in an aircraft compartment that can likely evidence a system anomaly or a system disruption from expected system function that can, for example, include detection of heat escaping from a ducted pathway (e.g., at a jointed region of, for example, a ducted pathway) including, for example, a bleed air duct locating within a wing compartment at a wing leading edge.

The low-melting point material can comprise a low-melting point material that can be a metal, a metal alloy, or other low-melting point material (e.g., a wax), and that can comprise at least one of: a bismuth-containing compound, a lead-containing compound, a tin-containing compound, an indium-containing compound, a thallium-containing compound, a gallium-containing compound, rose's metal, cerrosafe, wood's metal, field's metal, cerrolow 136, cerrolow 117, gallium, and combinations thereof. The low-melting point material can further comprise at least one of a wax-containing compound and other non-metallic-containing compounds, and combinations thereof. In one present example, the degradable retainer comprises a low-melting point material having a melting point ranging from about 140° F. to about 165° F.

According to a present aspect, at a threshold temperature and as the degradable retainer changes phase from solid phase to liquid phase, a compressed spring that can be embedded with the degradable retainer material is released, and the spring is released from a compressed state toward an expanded state along a longitudinal axis of the spring, and a spring mechanical force is exerted on a movable element (e.g., a piston) to rupture a frangible vessel (referred to equivalently herein as "frangible container", "frangible battery electrolyte container", "frangible battery electrolyte vessel") containing a liquid battery electrolyte. The liquid battery electrolyte releases from the ruptured frangible vessel and the electrolyte is driven by the piston into a battery compartment such that the presence of the battery electrolyte in the battery compartment forms a battery capable of delivering an electrical current (e.g., an electrical charge) to an indicating element that can be a visually detectable indicator (referred to equivalently as a "visually detectable signaling device") that can be a light fixture, and that can be, for example a light-emitting diode (LED). An electrical current from the activated battery travels along an electrical circuit established from the activated battery to activate the light fixture, with visually detectable light beams (and that can be light beams from a flashing light fixture) emitted from the light fixture, and providing a visual indication of a temperature that exceeds the selected threshold temperature existing in the region of the thermal indicator.

FIGS. 2 and 3 are cross-sectional side views of a present aircraft compartment thermal indicator 20 in position fixedly and removably attached to and extending through an aircraft component substrate 18 having an aircraft component substrate outer surface 18a and an aircraft component substrate inner surface 18b. FIGS. 2 and 3 depict the same thermal indicator 20, but with internal components of the thermal indicator 20 moved from a compressed or compacted state shown in FIG. 2 toward and to an expanded or "released" state shown in FIG. 3.

As shown in FIG. 2, the aircraft component substrate 18 can be in an aircraft component shown in FIG. 2 as a wing 14. As shown in FIG. 2, the present self-powered aircraft compartment thermal indicator comprises an indicator body 22 having an indicator body interior 22a and an indicator body exterior 22b. Indicator body 22 further comprises an indicator body wall 24 bounded by, and otherwise extending from and located between the indicator body wall first side 24a (referred to equivalently herein as the "indicator body wall inner and/or interior surface" 24a) and an indicator body wall second side 24b (referred to equivalently herein as the "interior body wall outer and/or exterior surface" 24b).

The indicator body 22 further comprises an indicator body first end 26 that can be substantially flush with the aircraft component outer surface 18a. Indicator body 22 further comprises an indicator body length "l" extending from the indicator body first end 26 to the indicator body second end 28. The indicator body 22 further comprises an indicator body second end 28 that can extend a selected distance, "d", away from the aircraft component inner surface 18b and that can extend into an aircraft compartment. As shown in FIG. 2, indicator body second end 28 further comprises an indicator body second end base 29. According to present aspects, the indicator body first end 26 is referred to equivalently herein as the indicator "indicating end", and the indicator body second end 28 is referred to equivalently herein as the indicator "temperature sensing end" and/or "sensing end".

In one present example (not shown in FIG. 2), the indicator body first end 26 can extend slightly from and to a distance that is slight beyond the aircraft component outer surface 18a. In another present example (not shown in FIG. 2), the indicator body first end 26 can be countersunk a selected distance into the aircraft component outer surface 18a.

As further shown in FIG. 2, the indicator body first end 26 can further comprise an indicator body first end through-opening 26a defined by indicator body first end through-opening wall 26b. Indicator body first end 26 further comprises indicator body first end threads 26c that are configured to physically engage with dimensionally matching threads (e.g., dimensionally "mating" threads) in the aircraft component substrate 18, for example, for the purpose of fixedly and releasably (and removably) engaging the aircraft compartment thermal indicator 20 in a selected location in the aircraft component substrate 18.

As shown in FIG. 2, self-powered aircraft compartment thermal indicator 20 comprises three sections including: 1) a battery compartment 30 bounded by and otherwise positioned adjacent the indicator body first end 26 and battery compartment base 30a; 2) an indicator body first chamber 25a defined by and otherwise positioned adjacent to and between the battery compartment 30 and piston base first side 38a of piston base 38 of piston 36; and 3) indicator body second chamber 25b defined by and otherwise positioned adjacent to and between the piston base second side 38b of the piston base 38 of the piston 36 and the indicator body second end base 29 at the indicator body second end 28. Battery compartment 30 is shown in FIG. 2 as comprising a plurality of battery plates 32 and a battery compartment base 30a, with the battery compartment base 30a comprising battery compartment base through openings 30b.

As further shown in FIG. 2, indicator body first chamber 25a comprises and is otherwise configured to house a frangible vessel 34 in an unruptured state, with the frangible vessel 34 shown containing an amount of battery electrolyte 34a enclosed within the frangible vessel 34 in the unruptured state. FIG. 2 further shows an internal piston 36 (referred to equivalently herein as "piston 36"), with the internal piston 36 further comprising piston base 38, and with piston base comprising piston base first side 38a facing into and otherwise forming a boundary "wall" of indicator body first chamber 25a. Piston base 38 further comprises piston base second side 38b facing into and otherwise forming a boundary "wall" of indicator body second chamber 25b. As shown in FIG. 2, indicator body first chamber can be bounded by and/or defined by battery compartment base 30a, indicator body wall first side 24a, and piston base first side 38a. Piston 36 further comprises piston rod 39 having a piston rod first end 39a in immediate contact with light fixture 40 that can be a light-emitting diode (LED) having a light lens 40a. Piston rod 39 further comprises a piston rod second end 39b that can be attached to or integral with piston base 38 at piston base first side 38a.

Indicator body second chamber 25b, as shown in FIG. 2 comprises a spring 42 having a spring first end 42a that can be located immediately adjacent to piston base second side 38b. Spring 42 further comprises spring second end 42b that can be located immediately adjacent to indicator body second end base 29. FIG. 2 further shows a degradable retainer 44 embedded into and otherwise presented to spring 42 as a "coating", a "built-up layer", "impregnated coating", etc., such that the degradable retainer in a solid state possesses a robustness of form that is sufficient to overcome an outward force of the spring 42. That is, according to present aspects, spring 42 in a compressed state, is held in the compressed state and with the spring retaining a potential outward force while the spring is embedded in the degradable retainer 44 while the degradable retainer 44 is in a solidified (e.g., "solid") state. In the compressed spring state shown in FIG. 2, indicator body second chamber 25b can be substantially bounded by and/or defined by material forming the degradable retainer 44, the piston base second side 38b, and the indicator body second end base 29.

According to present aspects, and as mentioned herein, the degradable retainer 44 is made from and otherwise comprises a selected "low-melting point" material that will begin to change state from a first state that is a substantially solid state (e.g., a substantially "solid phase") having a first retaining force to a second state that is at least one of a liquid state and a semi-solid state that can be, for example, a "gelled" state (collectively referred to herein as the "liquid state" and/or "liquid phase"), and having a second retaining force in the liquid state that is less than the first retaining force, with the second retaining force also being less than the potential outward force of the compressed spring that is successfully held (e.g., "retained" by the solid retainer) in a compressed state when the degradable retainer is in the solid phase.

Accordingly, FIG. 2 shows the present self-powered aircraft compartment thermal indicator in the "inactive" configuration when an ambient temperature is below a threshold temperature (e.g., where the spring is maintained in a compressed state and insufficient force is exerted on the frangible vessel to rupture the frangible vessel (and release the contents of the frangible vessel) the frangible vessel. The thermal indicator "inactive" configuration connotes that the thermal indicator battery has not been formed in the thermal indicator.

In contrast to FIG. 2, and according to present aspects, FIG. 3 illustrates the self-powered aircraft compartment thermal indicator 20 now in an activated configuration in the presence of an elevated temperature above a selected threshold temperature (e.g., a temperature that is greater than/higher than a lower initial ambient temperature, etc.). The thermal indicator "activated" configuration connotes that the thermal indicator battery has been formed within the thermal indicator to power the thermal indicator.

As shown in FIG. 3, in sensing an elevated temperature that is at or above the selected threshold temperature (represented by the presence of heat source 46 that can cause an elevated temperature, and that can be in the form of a flame, etc.), thermal indicator 20 is "activated" into an activate indicator state (from the inactive indicator state shown in FIG. 2), with degradable retainer 44 now moving from a solid phase into a liquid phase, and releasing spring 42 from the compressed spring state shown in FIG. 2. In the activated indicator state shown in FIG. 3, as the potential outward force of the spring 42 exerts a realized and less restrained and/or unrestrained outward actual force along the longitudinal axis of the spring (shown in FIG. 3 as an "upward" force) and on piston 36. As shown in FIG. 3, the area of the indicator body second chamber 25b expands to consume and otherwise increase to substantially completely occupy the area of the former indicator body first chamber 25a that existed in the thermal indicator in the thermal indicator "inactive" state (indicator body first chamber 25a shown in FIG. 2, and absent from FIG. 3).

In operation, and when the thermal indicator 20 is exposed to a temperature that is above the selected threshold temperature, the force from the releasing spring 42 is transferred to the piston 36, forcing the piston 36 into the indicator body first chamber 25a, and with a sufficient force to cause the piston to compress the frangible vessel 44 between the piston base 38 and the battery compartment base 30*a*, and with sufficient force to rupture the frangible vessel 34. The rupture of the frangible vessel 34 releases battery electrolyte 34*a* from the now-ruptured frangible vessel 34 (that can be, for example, an ampule that can be, for example, a thin-walled glass ampule, etc.). As the liquid electrolyte 34*a* is released from the now ruptured frangible vessel 34, the electrolyte is driven from the diminishing area of the indicator body first chamber and into the battery compartment 30 through the battery compartment base through openings 30*b* in the battery compartment base 30*a*.

As shown in FIGS. 2 and 3, O-ring 38*c* is positioned about the circumference of piston base 38 to form a seal that is a substantially leakproof seal between piston base 38 and indicator body wall first side (e.g.; indicator body wall "inner surface") while also facilitating and not otherwise impeding relative movement of the piston in response to the force of spring 42 (e.g., a force adequate to rupture the frangible vessel and effect release of the battery electrolyte from the frangible vessel into the battery. In addition to preventing unwanted electrolyte leakage into the indicator body second chamber, the O-ring 38*c* is made from a resilient and robust material (e.g., silicone, rubber, etc.) and having a selected Young's modulus and other O-ring material characteristics (e.g., physical and chemical properties, etc.) that serves to maintain the electrolyte in place within the battery compartment 30.

As shown in FIG. 3, the position of the piston base 38 immediately against the battery compartment base 30*a* further seals the battery compartment base through openings 30*b*, with the maximum available volume of electrolyte 34*a* (referred to equivalently herein as "battery electrolyte") transferred from the ruptured frangible vessel 34 (containing the electrolyte) into the battery compartment 30 to react with battery plates 32 and to form the now active and/or "activated", working battery 33 that is configured to generate an electrical current along battery lead 33*a* to activate light fixture 40 and to emit light beams 41 from light fixture 40 (that can be, e.g., a LED) in the operative (and/or "active" and/or "activated") thermal indicator state.

As further shown in FIG. 3, similar to the sealing function of the piston base O-ring 38*c*, the piston rod O-ring 38*d* located at the indicator body first end through opening wall 26*b* and configured to contact the emerging piston rod 39. Piston rod O-ring 38*d* is further configured and positioned to form a substantially leakproof seal to facilitate retaining battery electrolyte in battery 33 and within battery compartment 30. As with the piston base O-ring 38*c*, piston rod O-ring 38*d* can be made from and/or can otherwise comprise a resilient and robust material (e.g., silicone, rubber, etc.) that can have a selected Young's modulus and other O-ring material characteristics (e.g., physical and chemical properties, etc.) that serves to maintain the electrolyte in place within the battery compartment 30.

FIGS. 4A and 4B illustrate further present aspects, including the present self-powered aircraft compartment thermal indicator 20 that can further comprise one or more integrated heat transfer elements to further increase the efficiency of and further increase the sensitivity of the present thermal indicators by, according to one present example, concentrating and conserving the effect and impact of an increasing temperature occurring proximate to the thermal indicator.

FIG. 4A is a cross-sectional side view of a present aircraft compartment thermal indicator 20 in position fixedly and removably attached to and extending through an aircraft component substrate 18 having an aircraft component substrate outer surface 18*a* and an aircraft component substrate inner surface 18*b*. FIG. 4A illustrates, the self-powered aircraft compartment thermal indicator 20 of the type shown in FIG. 2 and further comprising similar component elements that are numbered similarly. FIG. 4A shows, thermal indicator 20 further comprising an integrated heat transfer element in the form of a heat-directing tube 50 that is positioned and otherwise integrated within (and that can be fixedly attached within) the indicator body second chamber 25*b* of the thermal indicator 20, with the heat-directing tube 50 comprising a heat-directing tube first end 50*a* extending into the indicator body second chamber 25*b* and positioned such that the outer perimeter of the heat-directing tube wall 54 is positioned in close proximity to and/or substantially immediately adjacent to the degradable retainer 44. In one present example, the heat-directing tube 50 is in direct contact with the degradable retainer 44. The heat-directing tube second end 50*b* is shown in FIG. 4A extending a selected distance out from the indicator body second chamber 25*b* and past the indicator body second end base 29. As shown in FIG. 4A, the heat-directing tube 50 can further comprise "hot air" vent 66 located at the heat-directing tube first end 50*a* that can further direct, circulate, and otherwise distribute heat to the degradable retainer 44.

FIG. 4B shows a perspective view of a segment of a heat-directing tube 50 of the type shown in FIG. 4A, and that can be incorporated into, the thermal indicator 20 shown in FIG. 4A. As also shown in FIG. 4B, the heat-directing tube 50 can be substantially cylindrical in shape, having an outer perimeter dimensioned such that the heat-directing tube can substantially "fill" or otherwise substantially occupy the available area existing within the indicator body second chamber, with that the outer surfaces of the edges of the tube fins 52 extending outwardly from the outer surface of the heat-directing tube wall 54 of the heat-directing tube 50 (forming the outer perimeter of the heat-directing tube 50) that can directly contact the degradable retainer 44 that comprises the low-temperature material used to fabricate the degradable retainer element. According to present aspects, the outer edges of the tube fins 52 are equivalently referred to herein as the heat-directing tube wall outer perimeter. Further presents aspects contemplate the incorporation of a heat-directing tube that does not comprise tube fins 52, with the heat-directing tube wall then coming into close proximity and located adjacent to the degradable retainer. In another present example, the heat-directing tube wall outer perimeter is positioned in direct contact with the degradable retainer (for example, in the absence of the tube fins 52).

As shown in FIGS. 4A and 4B the heat-directing tube 50 can be "hollowed-out" to further comprise a heat-directing tube central pathway 56 extending the length, longitudinally, of the heat-directing tube 50, and with the heat-directing tube central pathway 56 defined by a heat-directing tube inner surface of the heat-directing tube inner wall 54.

As further shown in FIGS. 4A and 4B, the tube fins 52 extend a selected distance outwardly from the heat-directing tube inner wall 54 with the tube fins 52 configured to facilitate the radiation of heat that may be absorbed by the heat-directing tube 50 (e.g., absorbed by the thermal indicator heat-directing tube within an aircraft compartment) and then directed and/or "radiated" to the degradable retainer 44 located within the indicator body second chamber 25*b* of the thermal indicator 20. As shown in FIG. 4A, the heat-directing tube second end 50*b* extends from the thermal indicator body second end base 29 to enhance the collection of heat that may exist and that otherwise may be generated outside of and proximate to the thermal indicator 20 and outside of and proximate to the heat-directing tube second end 50*b* (e.g., heat that may be building up within an aircraft compartment into which the indicator body second end can extend, exposing the thermal indicator second end to an aircraft compartment environment and a temperature residing within the aircraft compartment environment. The present heat-directing tube can be made from a material having a high heat-transfer ability that can include a metal, and metal alloys, and further including, for example, copper, copper alloys, and combinations thereof.

According to present aspects, the power supply for operating the present activated self-powered aircraft compartment thermal indicator resides solely within the thermal indicator, and in the battery that is formed within the thermal indicator, on demand, and in the presence of as threshold temperature, by combining the released battery electrolyte from the ruptured frangible vessel, and with the battery plates within the battery compartment of the thermal indicator. According to present aspects, the battery type that is formed in the present thermal indicator can be a fuze-type battery.

When activated and operational, and depending upon the intensity of the light beam(s) emitted from the light fixture, the present self-powered aircraft compartment thermal indicator is configured to deliver a visually detectable signal at least to personnel at or very near to the location of the thermal detector at the location that is immediately exterior to the aircraft compartment being monitored. That is, the present thermal indicator presents significant advantages for ground personnel in the monitoring of an aircraft compartment potentially overheating, with the visual indication of the overheating compartment visible to ground personnel from the exterior of an aircraft that is on the ground, and in a non-flight phase and at a time when personnel may not be located within a cockpit and able to access a flight control panel in a cockpit. According to one present example, a flashing light emanating from the present thermal indicator's light fixture that is powered by the present self-powered aircraft compartment thermal indicator can visually indicate, and alert personnel to, the existence of an excessive temperature (e.g., a temperature that is beyond a selected temperature threshold) and can visually convey to ground personnel (e.g., that can view the visual indication and be warned vias the visual "temperature alarm") that an internal compartment located within the aircraft and located within the internal compartment that is in the immediate region of the flashing thermal indicator is experiencing and is otherwise sustaining an excessive temperature requiring attention.

Accordingly, the present self-powered aircraft compartment thermal indicator that is configured to convey thermal information at the location of a potential thermal event is in strong contrast to typical aircraft thermal detector systems that may be connected in series and that are connected to, or that are otherwise in communication with, significant amounts of wiring to an aircraft power source and to each other, and that further require associated hardware, software, mechanical linkages and mountings, processors, readouts, control panels, other centralized system components, etc., that can relay sensed thermal information to a centrally-located location within an aircraft (e.g., a cockpit panel), and that can add significant cost and weight to an aircraft that can further increase aircraft operational cost and otherwise adversely impact aircraft flight range, increasing aircraft fuel consumption, decreasing available aircraft passenger seating capacity, etc.

According to present aspects, once activated, the activated self-powered aircraft compartment thermal indicator cannot be restored to an inactive state once the degradable retainer is degraded and releases the spring that is then allowed to exert a force on the piston that ruptures the frangible vessel holding the battery electrolyte. According to a further present aspect, the thermal indicator is removably secured and positioned into an aircraft structure such that an activated thermal indicator can be removed from the aircraft structure and replaced with another "inactive" thermal indicator.

FIG. 4C is a box diagram outlining a system for indicating, at an aircraft exterior position and determining the presence of, a temperature having exceeded a threshold temperature within an aircraft interior region located proximate to the aircraft exterior position. According to present aspects, and as shown in FIG. 4C, system 58 comprises an aircraft 10, that further comprises an aircraft component substrate 18 that further comprises a self-powered aircraft compartment thermal indicator 20 of the type described herein.

FIGS. 5A and 5B illustrate testing methods (e.g., inspection and/or quality control protocol methods), according to present aspects, for testing the force load/release/activation of the present thermal indicator (FIG. 5A), and testing, in situ and installed, and/or while in inventory storage, the satisfactory working and/or functional operation of the light fixture element of the thermal indicator (FIG. 5B), including while the thermal indicator battery is in the inactive state.

As shown in FIG. 5A a system 60, referred to equivalently herein as a load cell testing system 60, in the form of a present testing method for the present thermal indicator, is shown for determining the release force of the spring that a degradable retainer will release at a threshold temperature, and for testing that the spring will release as intended and with suitable applied force supplied to the piston to rupture the frangible battery electrolyte vessel when the thermal indicator is in the presence of, or is otherwise exposed to, an elevated temperature that represents a temperature that exceeds a selected threshold temperature. As shown in FIG. 5A, load cell 64 (referred to equivalently herein as a force gauge 64) can be positioned within a cap 62 to be fitted onto the thermal indicator 20, with the load cell configured to assess and otherwise measure the releasable or potential force of the spring 42. The load cell 64 is placed in communication with a data acquisition device/processor 65 via data lead 64*a*, with a display 68 configured to relay signals and information generated by the load cell and interpreted by the processor (e.g., to an observer, technician, etc.) via data line 67.

According to a present testing protocol for testing the operating force of the present self-powered aircraft compartment thermal indicator 20, a texting fixture is supplied to support the thermal indicator and a data acquisition device 65 comprising a processor/computer is attached to the test fixture. Data acquisition software is run to record and display the data acquired via test. A temperature sensor can be located near the thermal element of the heat-directing element to ensure that the thermal indicator is properly calibrated and connected to the data acquisition device. A temperature change is established to verify the temperature sensor function operation by heating or cooling the sensor. A force gauge is brought into position in contact with the thermal indicator first end and is further brought into contact with the piston rod first end at the light fixture (that, in the inactive state, and the force gauge is configured to remain substantially flush with the thermal indicator body first end). The force gauge is set to "zero", or otherwise calibrated according to manufacturer instructions. A heat source that can be in the form of, for example, a heat gun 46 (referred to equivalently as a "hot air gun", etc.) is positioned to provide heat to the thermal indicator and the testing thermal indicator force testing/confirmation system. Heat is applied to the thermal indicator heat-directing tube, with the heat directed from the heat source evenly distributed across the heat-directing tube of the thermal indicator. Heating time is marked and recorded via use of a timekeeping device (e.g., stopwatch, etc.). As thermal indicator threshold temperature is approached and reached, time is marked, and the internal spring will release creating force that is registered on the force gauge, with the maximum force exerted on the force gauge displayed during the release of the spring on the system display and otherwise displayed and recorded. Temperature and spring release force time can be recorded and plotted.

FIG. 5B is a diagram illustrating in situ testing of the presently disclosed installed self-powered aircraft thermal indicator 20 that is installed into a fixed and removable location in aircraft component substrate 18. According to testing system 70, to assess the proper working condition of the thermal indicator during, for example, a scheduled maintenance and/or inspection of an aircraft component comprising the thermal indicator, a the positive ("+") terminal of battery 72 can be placed into contact with an exposed pad of the thermal indicator via testing lead 76, and with the negative ("−") terminal of battery 72 placed into contact via testing lead 74. As the electrical current supplied by battery 72 powers the thermal indicator, a flashing light at light fixture 40 will indicate a properly functioning light fixture and confirm a functioning circuit within the thermal indicator.

FIG. 6 is a representative cross-sectional side view of a section of a wing leading edge 16 of an aircraft wing 14 that can be a type of aircraft component substrate 18 described herein and that can comprise an aircraft component substrate outer surface 18a. Wing leading edge 16 as shown in FIG. 6 further comprises a wing leading edge compartment 16a that can further comprise, internally within the compartment 16a, a wing leading edge bleed air duct 16b (shown in FIG. 7) having a plurality of wing leading edge bleed air duct joints 16c. FIG. 6 further shows a present self-powered aircraft thermal indicator 20 removably affixed to the aircraft component substrate, and with indicator body first end at least partially visible at the aircraft component substrate outer surface 18a of the aircraft component substrate 18 that is shown as a wing leading edge component 16. That is, as shown in FIG. 6, the thermal indicator 20 is positioned such that the "indicating" indicator body first end 26 is visible at the exterior of the substrate outer surface 18a of the aircraft component substrate 18, and the "temperature sensing" indicator body second end 28 is located and otherwise extends into and is positioned within the aircraft wing leading edge compartment 16a.

FIG. 7 is a perspective view of an aircraft wing leading edge component 16d of the type configured to support wing leading edge bleed air duct 16b within the wing leading edge compartment 16a of the type shown in FIG. 6. The wing leading edge bleed air duct 16b can be configured to accept and direct hot bleed air along a path that safely disperses the hot bleed air to an exit (not shown). In the even that one or more of the plurality of hot bleed air duct joints 16c wear through use or otherwise leak the hot bleed air from the duct (e.g., the hot bleed air that is traversing the wing leading edge bleed air duct 16b), the hot bleed air can escape the duct and enter and occupy the wing leading edge compartment 16a, significantly raising the temperature of the ambient temperature air in the wing leading edge compartment 16 of the wing leading edge 16.

According to present aspects, and as shown in FIG. 6, in the event that a warm and/or hot bleed air stream 17 leaks from the wing leading edge bleed air duct 16b, the indicator body second end 28 will become exposed to an increasing temperature within the wing leading edge compartment 16a. If the temperature of the air within the wing leading edge compartment elevates to the selected acceptable threshold temperature (e.g., ranging from about 140° F. to about 165° F.), the self-powered aircraft compartment thermal indicator 20 will activate as the degradable retainer releases the internal spring, driving the internal piston into a position and with sufficient released spring force to rupture the battery electrolyte vessel and releasing the battery electrolyte from the vessel, and forming an activated battery in the indicator that powers the light fixture in the indicator first end that is viewable and otherwise visually detectable at the exterior of the aircraft component shown as a wing leading edge 16 (e.g., visually detectable by ground personnel at a position exterior to and "outside of" the aircraft). According to present aspects, in operation, and in the event of such an alert or "visual alarm" (e.g., a flashing light) emanating from the activated thermal indicator 20, personnel visually detecting the flashing light of the thermal indicator 20 will be made aware of an undesired temperature increase within the compartment of the aircraft component housing the thermal indicator (e.g., in this case, the wing leading edge compartment 16a).

According to present aspects, the self-powered aircraft thermal indicator can be removably engaged into an aircraft component with visual indication of a thermal event, servicing, inspection, rework, and replacement after a thermal event, etc., able to occur at an aircraft exterior by, for example, ground personnel. In addition, upon removal of the thermal indicator, access for inspection into an aircraft compartment that housed the thermal indicator is provided that can result in more efficient and cost-effective inspection of an aircraft compartment from the exterior of the aircraft by, for example, ground personnel.

In addition, the "single-use" nature of the present thermal indicators that enables facile replacement of the removably attached self-powered aircraft thermal indicators further contemplates advantageously organizing and otherwise significantly simplifying maintaining an inventory of varying thermal indicators for various locations on an aircraft that can be installed into varying aircraft components on an aircraft, with varying thermal indicator-types having differing "triggering" or threshold temperatures among a variety of such present thermal indicators that can be targeted and that can be otherwise tailored for specified uses and locations in an aircraft. That is, the present thermal indicator "types" with each type having a varying triggering threshold temperature can be differentiated by their intended location use and otherwise categorized as being activated at varying threshold temperatures depending on their eventual location destination on an aircraft For example, according to present aspects, thermal indicators having a differing activation threshold temperature can be separately identifiable via easily identifiable markings that can include, for example, "color coding" or other quickly identifiable features (to ensure that a particular thermal indicator is correctly used at a particular aircraft location according to the threshold temperature established for a particular aircraft component compartment) that can facilitate and/or organize the maintaining of a useable and easily identifiable thermal indicator inventory.

FIGS. 8, 9, and 10 are flowcharts outlining present methods. FIG. 8 outlines a present method 100 for detecting at an aircraft exterior a threshold temperature within an aircraft component internal region that can include an aircraft compartment located proximate to the aircraft exterior, with the method 100 comprising positioning 102 a self-powered aircraft compartment thermal indicator in an aircraft component, with the aircraft component comprising an aircraft component outer surface (e.g., aircraft exterior surface), with the aircraft component outer surface positioned adjacent to the aircraft component internal region that can include an aircraft compartment, with the aircraft compartment thermal indicator 20 comprising an indicator body 22 comprising an indicator body length ("l"). The indicator body further comprises an indicator body interior 22a, an indicator body exterior 22b, an indicator body first end 26 (e.g., indicating side), an indicator body second end 28 (e.g., temperature sensing side), an indicator body second end base 29, and an internal piston 36. The internal piston further comprises, a piston base 38, with the piston base comprising a piston base first side 38a and a piston base second side 38b, with the internal piston further comprising a piston rod 39, and with the piston rod comprising a piston rod first end 39a and a piston rod second end 39b, and with the piston rod second end at least in communication with the piston base first side 38a. The indicator body further comprises an indicator body wall 24, with the indicator body wall extending along the indicator body length from the indicator body first end 26 to the indicator body second end 28, and with the indicator body wall comprising an indicator body wall second side (e.g., an indicator body wall "outer surface") 24b at the indicator body exterior 22b, and an indicator body wall first side (e.g., an indicator body wall "inner surface") 24a at the indicator body interior 22a. The indicator body further comprises a battery compartment 30 comprising a plurality of battery plates, with the battery compartment comprising a battery compartment base 30a, and with the battery compartment defined by the battery compartment base 30a and the indicator body wall inner surface 24a. The indicator body further comprises an indicator body first chamber 25a defined by the indicator body wall inner surface 24a, the piston base first side 38a, and the battery compartment base 30a, with the indicator body first chamber comprising a frangible container 34, and with the frangible container housing a volume of battery electrolyte 34a. According to present aspects, the frangible container is referred to equivalently herein as "frangible vessel".

The indicator body further comprises an indicator body second chamber 25b defined by the indicator body wall inner surface 24a and the piston base second side 38b, with the indicator body second chamber 25b comprising a spring 42, with the spring comprising a spring first end 42a fixedly attached to the piston base 38, and with the spring further comprising a spring second end 42b located immediately adjacent the indicator body second end base 29. The indicator body second chamber further comprises a degradable retainer 44, with the degradable retainer in communication with spring 42, with the degradable retainer configured to retain the spring 42 in a compressed spring state within a first temperature range, with the degradable retainer 44 configured to degrade at a threshold temperature, with the threshold temperature within a second temperature range, with the degradable retainer further configured to retain the spring in a compressed spring state while at the first temperature range, and with the degradable retainer further configured to release the spring from the compressed spring state toward an expanded spring state at the threshold temperature in the second temperature range, and wherein the threshold temperature is higher than the first temperature range.

The method 100 further comprises degrading 104 the degradable retainer in the presence of a compartment temperature exceeding a threshold temperature, releasing 106 the spring from the compressed spring state to the expanded spring state, delivering 108 the piston from a piston initial position to a piston deployed position, rupturing 110 the frangible container to form a ruptured frangible container, releasing 112 from the ruptured frangible container at least a portion of the volume of battery electrolyte, directing 114 at least a portion of the volume of battery electrolyte into the battery compartment to form a battery, with the battery configured to deliver produce electrical current, directing 116 the piston rod first end through the indicator body first end through-opening to a selected distance beyond the aircraft component outer surface, and directing 118 an electrical current from the battery to the light-emitting fixture to emit light from the light-emitting fixture.

FIG. 9 outlines a present method 200 comprising the features outlined in method 100 and shown in FIG. 8 and disclosed herein, with present method 200 further comprising visually detecting 202 at the aircraft exterior light emitted from light-emitting fixture, with the visual detecting evidencing the existence of at least a threshold temperature occurring within the aircraft compartment that is located adjacent to or that is otherwise in direct communication with the aircraft compartment thermal indicator.

FIG. 10 outlines a present method 300 comprising the features outlined in methods 100, 200 and shown in FIGS. 8, 9, respectively, and described herein, with present method 300 further comprising removably positioning 302 the self-powered aircraft compartment thermal indicator in the aircraft component.

The present methods outlined in FIGS. 8, 9, and 10, and described herein can implement the present self-powered aircraft compartment thermal indicator described herein and shown at least in FIGS. 2, 3, 4A, 4B, 5A, 5B, and 6.

The term "substantially" as used herein means that a particular physical element, physical positioning, physical shape, orientation, etc., is almost completely or is nearly achieved. That is, for example, according to present aspects, a "substantially" completely enclosed compartment is meant to include a nearly and/or almost entirely and completely enclosed compartment.

The presented aspects can, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A self-powered aircraft compartment thermal indicator comprising:
    an indicator body comprising an indicator body length,
       said indicator body comprising:
       an indicator body interior;
       an indicator body exterior;
       an indicator body first end;
       an indicator body second end;
       an indicator body second end base;

an internal piston, said internal piston comprising a piston base, said piston base comprising a piston base first side and a piston base second side, said internal piston further comprising a piston rod, said piston rod comprising a piston rod first end and a piston rod second end, said piston rod first end in communication with a visually detectable signaling device, said piston rod second end at least in communication with the piston base first side;

an indicator body wall, said indicator body wall extending along the indicator body length from the indicator body first end to the indicator body second end, said indicator body wall comprising an indicator body wall outer surface at the indicator body exterior and an indicator body wall inner surface at the indicator body interior;

a battery compartment, said battery compartment comprising a battery compartment base, said battery compartment defined by the battery compartment base and the indicator body wall inner surface;

an indicator body first chamber defined by the indicator body wall inner surface, the piston base first side, and the battery compartment base, said indicator body first chamber comprising a frangible container, said frangible container housing a volume of battery electrolyte;

an indicator body second chamber defined by the indicator body wall inner surface and the piston base second side, said indicator body second chamber comprising a spring, said spring comprising a spring first end fixedly attached to the piston base, said spring further comprising a spring second end located immediately adjacent the indicator body second end base; and a degradable retainer, said degradable retainer in communication with said spring, said degradable retainer configured to retain the spring in a compressed spring state within a first temperature range, said degradable retainer configured to degrade at a threshold temperature, said threshold temperature within a second temperature range, said degradable retainer further configured to retain the spring in a compressed spring state while at the first temperature range, said degradable retainer further configured to release the spring from the compressed spring state toward an expanded spring state at the threshold temperature in the second temperature range; and wherein said threshold temperature is higher than the first temperature range.

2. The self-powered aircraft compartment thermal indicator of claim 1, wherein the visually detectable signaling device is at least one of a light fixture and a light-emitting diode.

3. The self-powered aircraft compartment thermal indicator of claim 1, wherein said battery compartment further comprises a plurality of battery plates.

4. The self-powered aircraft compartment thermal indicator of claim 3, wherein the battery plates in combination with the electrolyte form a battery configured to deliver an electrical current.

5. The self-powered aircraft compartment thermal indicator of claim 4, wherein the battery is a fuze battery.

6. The self-powered aircraft compartment thermal indicator of claim 1, wherein the degradable retainer comprises at least one of a low temperature alloy, and a wax, said degradable retainer comprising a melting point ranging from about 140° F. to about 165° F.

7. The self-powered aircraft compartment thermal indicator of claim 6, wherein the low temperature alloy comprises at least one of bismuth, lead, tin, indium, cadmium, thallium, gallium, and combinations thereof, said low temperature alloy comprising a melting point ranging from about 140° F. to about 165° F.

8. The self-powered aircraft compartment thermal indicator of claim 7, wherein the low temperature metal alloy comprises at least one of rose's metal, cerrosafe, wood's metal, field's metal, cerrolow 136, cerrolow 117, gallium, and combinations thereof.

9. The self-powered aircraft compartment thermal indicator of claim 1, further comprising a heat-directing tube, said heat-directing tube comprising a heat-directing tube first end, a heat-directing tube second end, and a heat-directing tube wall, said heat-directing tube first end integrated into the indicator body second chamber, said heat-directing tube wall positioned immediately adjacent to the degradable retainer.

10. An aircraft wing component comprising the self-powered aircraft compartment thermal indicator of claim 1.

11. An aircraft comprising the self-powered aircraft compartment thermal indicator of claim 1.

12. An aircraft compartment temperature indication system for visually detecting at an aircraft exterior an above-threshold temperature within an aircraft compartment proximate to the aircraft exterior, the aircraft compartment temperature indication system comprising:

a self-powered aircraft compartment thermal indicator removably attached to an aircraft component, said self-powered aircraft compartment thermal indicator comprising:

an indicator body comprising an indicator body length, said indicator body comprising:

an indicator body interior;

an indicator body exterior;

an indicator body first end visible at an aircraft exterior;

an indicator body second end positioned within the aircraft compartment and extending into the aircraft compartment a selected distance from the indicator body first end;

an indicator body second end base;

an internal piston, said internal piston comprising a piston base, said piston base comprising a piston base first side and a piston base second side, said internal piston further comprising a piston rod, said piston rod comprising a piston rod first end and a piston rod second end, said piston rod second end at least in communication with the piston base first side;

an indicator body wall, said indicator body wall extending along the indicator body length from the indicator body first end to the indicator body second end, said indicator body wall comprising an indicator body wall outer surface at the indicator body exterior and an indicator body wall inner surface at the indicator body interior;

a battery compartment configured to house a battery, said battery configured to deliver an electrical current along an electrical circuit, said battery compartment comprising a plurality of battery plates, said battery compartment comprising a battery compartment base, said battery compartment defined by the battery compartment base and the indicator body wall inner surface;

an indicator body first chamber defined by the indicator body wall inner surface, the piston base first side, and the battery compartment base, said indicator body first chamber comprising a frangible container, said frangible container housing a volume of battery electrolyte;

an indicator body second chamber defined by the indicator body wall inner surface and the piston base second side, said indicator body second chamber comprising a spring, said spring comprising a spring first end fixedly attached to the piston base, said spring further comprising a spring second end located immediately adjacent the indicator body second end base; and a degradable retainer, said degradable retainer in communication with said spring, said degradable retainer configured to retain the spring in a compressed spring state within a first temperature range, said degradable retainer configured to degrade at a threshold temperature, said threshold temperature within a second temperature range, said degradable retainer further configured to retain the spring in a compressed spring state while at the first temperature range, said degradable retainer further configured to release the spring from the compressed spring state toward an expanded spring state at the threshold temperature in the second temperature range;

a visually detectable signaling device located at the indicator body first end, said visually detectable signaling device in communication with the electrical circuit, said visually detectable signaling device further configured to be visually detectable at the aircraft exterior; and wherein said visually detectable signaling device is configured to activate at and above a threshold temperature.

13. The aircraft compartment temperature indication system of claim 12, wherein the visually detectable signaling device comprises at least one of a light fixture and a light-emitting diode.

14. The aircraft compartment temperature indication system of claim 12, wherein the visually detectable signaling device is configured to emit a beam of light in response to the indicator second end being exposed to a threshold temperature ranging from about 140° F. to about 165° F.

15. The aircraft compartment temperature indication system of claim 12, wherein the self-powered aircraft compartment thermal indicator is a removable aircraft compartment thermal indicator.

16. The aircraft compartment temperature indication system of claim 12, wherein the battery is a fuze battery, said fuze battery configured to form and deliver an electrical current at the threshold temperature.

17. A method for indicating at an aircraft exterior a temperature exceeding a threshold temperature within an aircraft component compartment, the method comprising:

positioning a self-powered aircraft compartment thermal indicator in an aircraft component, said self-powered aircraft component comprising an aircraft component outer surface, said aircraft component outer surface positioned adjacent to an aircraft compartment, said self-powered aircraft compartment thermal indicator comprising:

an indicator body comprising an indicator body length, said indicator body comprising:

an indicator body interior;

an indicator body exterior;

an indicator body first end;

an indicator body first end through opening;

an indicator body second end;

an indicator body second end base;

an internal piston, said internal piston comprising a piston base, said piston base comprising a piston base first side and a piston base second side, said internal piston further comprising a piston rod, said piston rod comprising a piston rod first end and a piston rod second end, said piston rod second end at least in communication with the piston base first side, said piston rod first end comprising a light-emitting fixture;

an indicator body wall, said indicator body wall extending along the indicator body length from the indicator body first end to the indicator body second end, the indicator body second end base, said indicator body wall comprising an indicator body wall outer surface at the indicator body exterior and an indicator body wall inner surface at the indicator body interior;

a battery compartment comprising a plurality of battery plates, said battery compartment comprising a battery compartment base, said battery compartment defined by the battery compartment base and the indicator body wall inner surface;

an indicator body first chamber defined by the indicator body wall inner surface, the piston base first side, and the battery compartment base, said indicator body first chamber comprising a frangible container, said frangible container housing a volume of battery electrolyte;

an indicator body second chamber defined by the indicator body wall inner surface and the piston base second side, said indicator body second chamber comprising a spring, said spring comprising a spring first end fixedly attached to the piston base, said spring further comprising a spring second end located immediately adjacent the indicator body second end base; and a degradable retainer, said degradable retainer in communication with said spring, said degradable retainer configured to retain the spring in a compressed spring state at a first temperature range, said degradable retainer configured to degrade at a threshold temperature, said threshold temperature within a second temperature range, said degradable retainer further configured to release the spring from the compressed spring state while at the first temperature range to an expanded spring state at the threshold temperature in the second temperature range, said threshold temperature is higher than the first temperature range;

degrading the degradable retainer at the threshold temperature;

releasing the spring from the compressed spring state to the expanded spring state;

delivering the piston from a piston initial position to a piston deployed position;

rupturing the frangible container to form a ruptured frangible container;

releasing from the ruptured frangible container at least a portion of the volume of battery electrolyte;

directing at least a portion of the volume of battery electrolyte into the battery compartment to form a battery, said battery configured to produce electrical current;

directing the piston rod first end through the indicator body first end through-opening to a selected distance beyond the aircraft component outer surface; and directing an electrical current from the battery to activate the light-emitting fixture to emit light from the light-emitting fixture.

18. The method of claim 17, further comprising visually detecting light emitted from light-emitting fixture at the aircraft exterior.

19. The method of claim 18, further comprising removably positioning the self-powered aircraft compartment thermal indicator in the aircraft component.

20. The method of claim 18, wherein visually detecting at the aircraft exterior light from the self-powered aircraft compartment thermal indicator evidences at least a threshold temperature within the aircraft component compartment.

* * * * *